(12) United States Patent
Yamada

(10) Patent No.: US 10,482,592 B2
(45) Date of Patent: Nov. 19, 2019

(54) SHAPE MEASURING DEVICE, STRUCTURED OBJECT MANUFACTURING SYSTEM, SHAPE MEASURING METHOD, STRUCTURED OBJECT MANUFACTURING METHOD, SHAPE MEASURING PROGRAM, AND RECORDING MEDIUM

(71) Applicant: NIKON CORPORATION, Tokyo (JP)

(72) Inventor: Tomoaki Yamada, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 15/318,409

(22) PCT Filed: Jun. 13, 2014

(86) PCT No.: PCT/JP2014/065751
§ 371 (c)(1),
(2) Date: Dec. 13, 2016

(87) PCT Pub. No.: WO2015/189985
PCT Pub. Date: Dec. 17, 2015

(65) Prior Publication Data
US 2017/0132784 A1 May 11, 2017

(51) Int. Cl.
*G06T 7/00* (2017.01)
*G01B 11/25* (2006.01)
(Continued)

(52) U.S. Cl.
CPC ............ *G06T 7/0006* (2013.01); *G01B 11/25* (2013.01); *G06K 9/00335* (2013.01);
(Continued)

(58) Field of Classification Search
CPC ......... G06T 7/0006; G06T 7/74; G06T 7/001; G01B 11/2416; G01B 11/25;
(Continued)

(56) References Cited

U.S. PATENT DOCUMENTS

| 5,280,542 A | 1/1994 | Ozeki et al. |
| 6,268,918 B1 | 7/2001 | Tanabe et al. |

(Continued)

FOREIGN PATENT DOCUMENTS

| JP | 63-149507 | 6/1988 |
| JP | 2005-241570 | 9/2005 |

(Continued)

OTHER PUBLICATIONS

Extended European Search Report issued by the European Patent Office dated Dec. 5, 2017 in counterpart European Application No. 14 89 4726.

(Continued)

*Primary Examiner* — Thai Q Tran
*Assistant Examiner* — Sunghyoun Park
(74) *Attorney, Agent, or Firm* — Finnegan, Henderson, Farabow, Garrett & Dunner, L.L.P.

(57) ABSTRACT

An object is to measure the shape of an object to be measured under a more appropriate condition. A shape measuring device includes a projection unit configured to project a pattern onto a measurement target by light, an image capturing unit configured to capture a picture image of the measurement target onto which the pattern is projected by the projection unit, a movement unit capable of moving a projected position of the pattern on the measurement target by relatively moving the projection unit and the measurement target, and a region-of-interest setting unit configured to set a region of interest for acquiring information used to measure the measurement target to be in at least part of a region captured by the image capturing unit, so as to include an image of the pattern.

32 Claims, 22 Drawing Sheets

(51) Int. Cl.
*G06T 7/73* (2017.01)
*G06K 9/00* (2006.01)
*G06K 9/46* (2006.01)
*G06K 9/62* (2006.01)

(52) U.S. Cl.
CPC ......... *G06K 9/4671* (2013.01); *G06K 9/6201* (2013.01); *G06K 9/6267* (2013.01); *G06T 7/001* (2013.01); *G06T 7/74* (2017.01); *G06K 2009/4666* (2013.01)

(58) Field of Classification Search
CPC ........... G01B 11/2518; G06K 9/00335; G06K 9/4671; G06K 9/6201; G06K 9/6267; G06K 7/001; G06K 2009/4666
See application file for complete search history.

(56) References Cited

U.S. PATENT DOCUMENTS

| | | | |
|---|---|---|---|
| 6,724,491 B2 | 4/2004 | Matsunaga et al. | |
| 6,959,103 B2 | 10/2005 | Matsunaga et al. | |
| 8,107,685 B2 | 1/2012 | Matsunaga et al. | |
| 2003/0071194 A1* | 4/2003 | Mueller | G01B 11/00 250/208.1 |
| 2006/0034488 A1 | 2/2006 | Matsunaga et al. | |
| 2009/0171622 A1* | 7/2009 | Oue | B62D 65/005 702/167 |
| 2010/0008588 A1* | 1/2010 | Feldkhun | G01B 11/2518 382/206 |
| 2010/0295941 A1* | 11/2010 | Jeong | G01B 11/2531 348/135 |
| 2010/0302364 A1* | 12/2010 | Kim | G01B 11/2531 348/136 |
| 2011/0157353 A1* | 6/2011 | Takayama | H04N 7/183 348/135 |
| 2011/0172611 A1* | 7/2011 | Yoo | A61M 35/00 604/290 |
| 2012/0246899 A1 | 10/2012 | Yamada et al. | |
| 2012/0274757 A1* | 11/2012 | Bai | H01J 37/244 348/79 |
| 2014/0157579 A1* | 6/2014 | Chhabra | G06F 17/00 29/592 |
| 2014/0267623 A1* | 9/2014 | Bridges | G01S 17/003 348/46 |
| 2016/0073962 A1* | 3/2016 | Yu | A61B 5/721 600/407 |

FOREIGN PATENT DOCUMENTS

| | | |
|---|---|---|
| JP | 2008-096123 A | 4/2008 |
| JP | 2013-234854 | 11/2013 |
| WO | WO 91/10111 | 7/1991 |
| WO | WO 01/57471 A1 | 8/2001 |

OTHER PUBLICATIONS

International Search Report issued by the Japanese Patent Office in International Application No. PCT/JP2014/065651, dated Jul. 22, 2014 (4 pages).

Office Action issued by the Japanese Patent Office dated May 14, 2019 in counterpart Japanese Patent Application No. 2018-109745, and English Translation thereof.

* cited by examiner

SHAPE MEASURING DEVICE, STRUCTURED OBJECT MANUFACTURING SYSTEM, SHAPE MEASURING METHOD, STRUCTURED OBJECT MANUFACTURING METHOD, SHAPE MEASURING PROGRAM, AND RECORDING MEDIUM

FIELD

The present invention relates to a shape measuring device, a structured object manufacturing system, a shape measuring method, a structured object manufacturing method, a shape measuring program, and a recording medium.

BACKGROUND

A shape measuring device is, for example, an optical measuring device (refer to Patent Literature 1, for example) using a light-section method and including a projection unit configured to project a predetermined pattern such as slit light onto an object to be measured and an image capturing unit configured to capture a pattern image drawn by light projected on a measurement target region. Patent Literature 1 discloses a displacement sensor configured to detect an image included in a set measurement target region in captured and acquired picture image data and to measure displacement of an object to be measured. Patent Literature 1 also discloses that the measurement target region is moved in a displacement measurement direction, following movement of a reference surface.

CITATION LIST

Patent Literature

Patent Literature 1: WO 2001/057471

SUMMARY

Technical Problem

A shape measuring device disclosed in Patent Literature 1 moves the measurement target region in the displacement measurement direction, following movement of the reference surface. Specifically, the measurement target region is moved in the displacement measurement direction, following movement of the reference surface, on the basis of movement of a level-difference boundary line on the object to be measured. However, a moving direction and a moving distance of the position of the pattern on the picture image data in response to relative movement of the pattern and the object to be measured varies with, for example, the shape of the object to be measured, a relative moving direction of the pattern and the object to be measured, and relative positions of the projection unit and the image capturing unit, and the object to be measured, and thus the measurement target region cannot be appropriately set in some cases.

The present invention is achieved upon consideration of the above-described point and intended to provide a shape measuring device, a structured object manufacturing system, a shape measuring method, a structured object manufacturing method, a shape measuring program, and a recording medium that can appropriately extract, on the basis of movement of a projected position of a pattern, an image of the pattern projected on a measurement target and use the extracted image for measurement of the measurement target.

Solution to Problem

In first embodiment, a shape measuring device includes a projection unit configured to project a pattern onto a measurement target, an image capturing unit configured to capture a picture image of a measurement target onto which the pattern is projected by the projection unit, a movement unit capable of moving a projected position of the pattern on the measurement target by relatively moving the projection unit and the measurement target, and a region-of-interest setting unit configured to set a region of interest for acquiring information used to measure the measurement target, as at least part of a region captured by the image capturing unit to include an image of the pattern.

In second embodiment, a shape measuring device includes a projection unit configured to project a pattern onto a measurement target, an image capturing unit configured to capture a picture image of the measurement target onto which the pattern is projected by the projection unit, a movement unit capable of moving a projected position of the pattern on the measurement target by relatively moving the projection unit and the measurement target, and a region-of-interest generating unit capable of setting a reference region of interest for detecting an existence state of an image of the pattern projected on the measurement target captured by the image capturing unit, and configured to generate a region of interest that sets a region for acquiring information used for measurement depending on the existence state of the image of the pattern in the reference region of interest.

In third embodiment, a structured object manufacturing system includes a shaping device configured to shape a structured object based on designing information related to the shape of the structured object, the shape measuring device according to the first and second embodiments configured to measure the shape of the structured object shaped by the shaping device, and a control device configured to compare the designing information and shape information indicating the shape of the structured object measured by the shape measuring device.

In fourth embodiment, there is provided a shape measuring method that projects a pattern onto a measurement target, acquires picture image data by capturing a picture image of an image of the pattern projected onto the measurement target in a direction different from a projection direction of the pattern, and measures the shape of the measurement target based on the image of the pattern of the picture image data. The shape measuring method includes moving a projected position of the pattern relative to the measurement target, setting a region of interest for acquiring information used to measure the measurement target to be in at least part of a region captured by the image capturing unit, so as to include the image of the pattern, and measuring the shape of the measurement target based on the position of the image of the pattern positioned in the region of interest of the picture image data.

In fifth embodiment, a structured object manufacturing method includes shaping a structured object based on designing information related to the shape of the structured object, measuring the shape of the shaped structured object by the shape measuring method according to the fourth embodiment, and comparing the designing information and shape information indicating the measured shape of the structured object.

In sixth embodiment, there is provided a shape measuring program that projects a pattern onto a measurement target, acquires picture image data by capturing a picture image of an image of the pattern projected onto the measurement target in a direction different from a projection direction of the pattern, and measures the shape of the measurement target based on the image of the pattern of the picture image data. The shape measuring program is configured to cause a computer to execute moving a projected position of the pattern relative to the measurement target, setting a region of interest for acquiring information used to measure the measurement target to be in at least part of a region captured by the image capturing unit, so as to include the image of the pattern, and measuring the shape of the measurement target based on the position of the image of the pattern positioned in the region of interest of the picture image data.

In seventh embodiment, there is provided a computer-readable recording medium that records therein the shape measuring program according to the sixth embodiment.

Advantageous Effects of Invention

The present invention can appropriately extract an image of a pattern, use the extracted image for measurement of a measurement target, and measure the shape of an object to be measured under a more appropriate condition.

DESCRIPTION OF EMBODIMENTS

The present invention will be described below in detail with reference to the accompanying drawings. The following configuration (hereinafter referred to as the embodiment) for performing the invention is not intended to limit the present invention. Any component of the following embodiment includes those easily thought of by the skilled person in the art and those effectively identical or what are called equivalents. In addition, components disclosed in the following embodiment may be combined as appropriate.

In the description below, an XYZ Cartesian coordinate system is set, and a positional relation between components will be described with respect to the XYZ Cartesian coordinate system. The Z-axis direction is set to be, for example, the vertical direction, whereas the X-axis direction and the Y-axis direction are set to be, for example, directions parallel to the horizontal direction and orthogonal to each other. Rotation (tilt) directions around the X axis, the Y axis and the Z axis are set as θX, θY, and θZ-axis directions, respectively.

Embodiment

Figure 1:
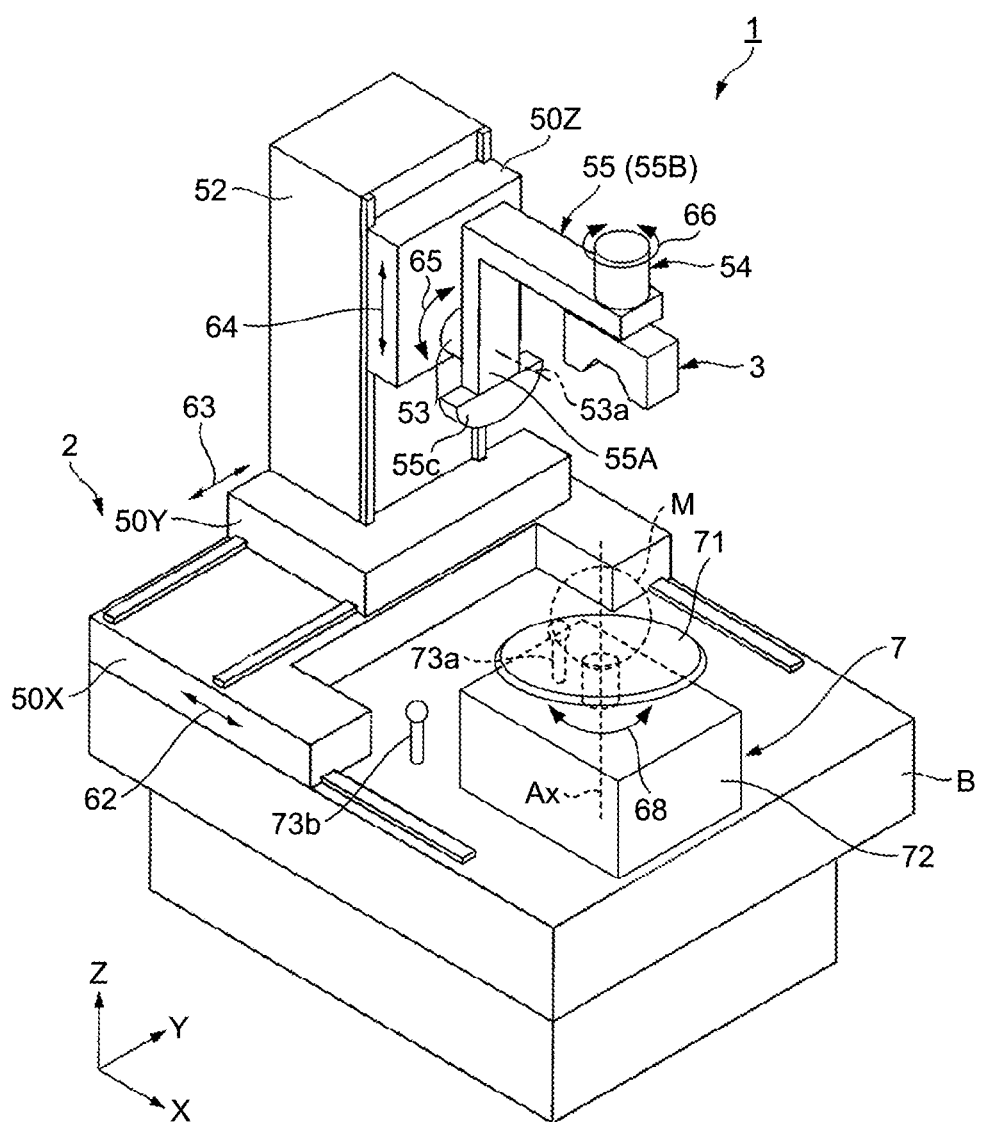
FIG. 1 is a perspective view illustrating a shape measuring device according to the present embodiment.
Figure 2:
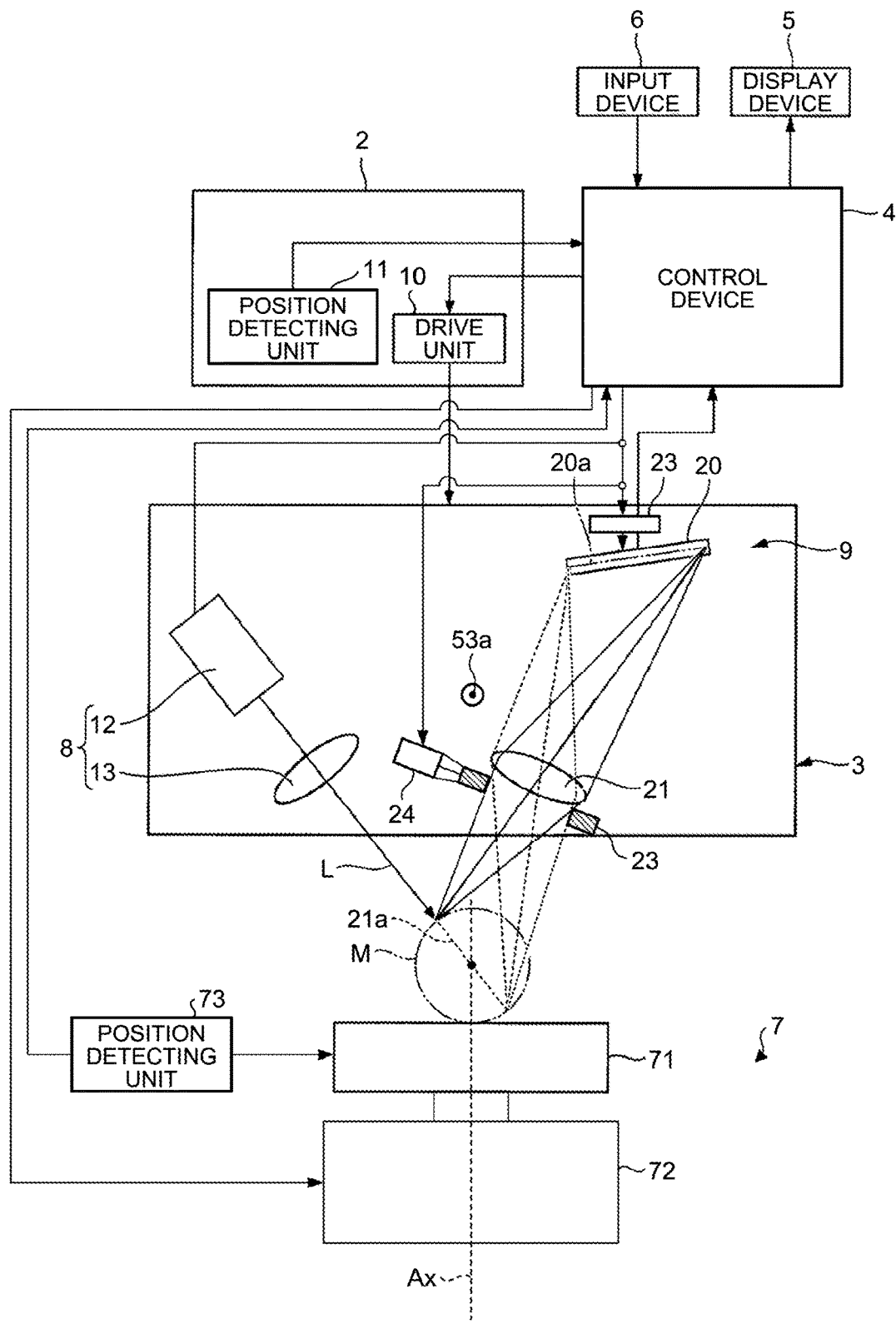
FIG. 2 is a pattern diagram illustrating the configuration of the shape measuring device according to the present embodiment.
Figure 3:
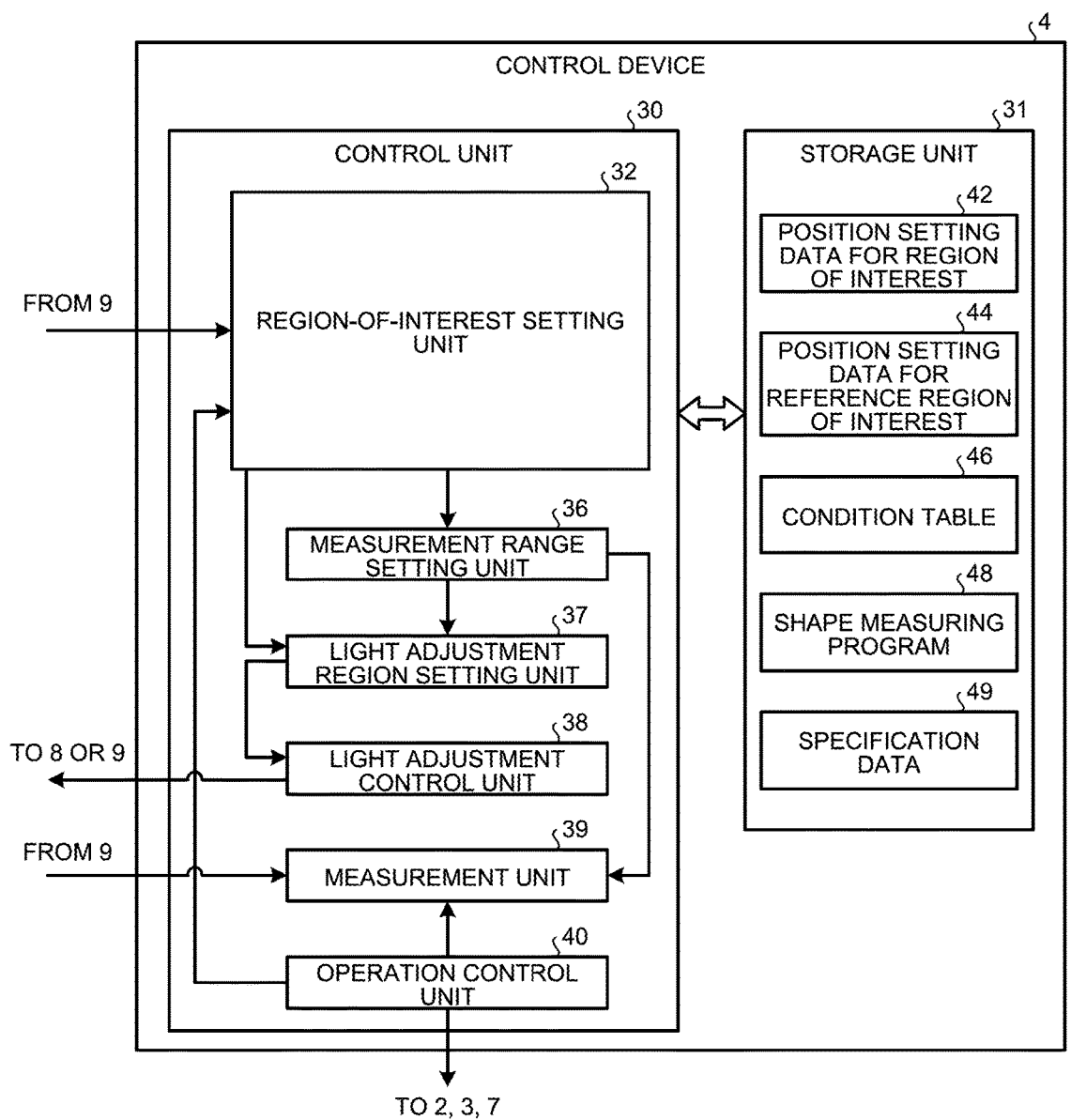
FIG. 3 is a block diagram of a schematic configuration of a control device of the shape measuring device according to the present embodiment.

FIG. 1 is a diagram illustrating the appearance of a shape measuring device 1 according to the present embodiment. FIG. 2 is a pattern diagram illustrating a schematic configuration of the shape measuring device according to the present embodiment. FIG. 3 is a block diagram of a schematic configuration of a control device of the shape measuring device according to the present embodiment.

The shape measuring device 1 measures the three-dimensional shape of an object (object to be measured) M as a measurement target by using, for example, a light-section method. The shape measuring device 1 includes a probe moving device 2, an optical probe 3, a control device 4, a display device 5, an input device 6, and a holding and rotating device 7. The shape measuring device 1 measures the shape of an object to be measured M held by the holding and rotating device 7 provided to a base B. In the measurement, while projecting a line-shaped pattern onto the object to be measured M, the optical probe 3 captures a picture image of an image of the line-shaped pattern on the object to be measured M. In the present embodiment, the probe moving device 2 and the holding and rotating device 7 serve as a movement mechanism that relatively moves the probe and the object to be measured M.

The probe moving device 2 moves the optical probe 3 relative to the object to be measured M so that the line-shaped pattern projected by the optical probe 3 is projected onto a measurement target region of the object to be measured M. The optical probe 3 is moved relative to the object to be measured N so that a projected position of the line-shaped pattern sequentially moves on the object to be measured M. As illustrated in FIG. 2, the probe moving device 2 includes a drive unit 10 and a position detecting unit 11. The drive unit 10 includes an X movement unit 50X, a Y movement unit 50Y, a Z movement unit 50Z, a first rotation unit 53, and a second rotation unit 54.

The X movement unit 50X is provided to move freely relative to the base B in a direction indicated by arrow 62, which is the X-axis direction. The Y movement unit 50Y is provided to move freely relative to the X movement unit 50X in a direction indicated by arrow 63, which is the Y-axis direction. The Y movement unit 50Y is provided with a holding member 52 extending in the Z-axis direction. The Z movement unit 50Z is provided to move freely relative to the holding member 52 in a direction indicated by arrow 64, which is the Z-axis direction. The X movement unit 50X, the Y movement unit 50Y, and the Z movement unit 50Z together with the first rotation unit 53 and the second rotation unit 54 serve as the movement mechanism that allows the optical probe 3 to move in the X-axis direction, the Y-axis direction, and the Z-axis direction.

The first rotation unit 53 changes the posture of the optical probe 3 by rotating the optical probe 3 supported by a holding member (holding unit) 55 to be described later in a rotational direction, which is a direction indicated by arrow 65, centering around a rotational axis line (rotational axis) 53a parallel to the X axis. Specifically, the first rotation unit 53 changes a projection direction in which the pattern is projected by the optical probe 3 onto the object to be measured M. The second rotation unit 54 changes the posture of the optical probe 3 by rotating the optical probe 3 supported by the holding member 55 in a rotational direction, which is a direction indicated by arrow 66, centering about an axis line parallel to a direction in which a first holding unit 55A to be described later extends. Specifically, the second rotation unit 54 changes, relative to the object to be measured M, the longitudinal direction of the line-shaped pattern projected by the optical probe 3. The shape measuring device 1 includes a reference ball 73a or a reference ball 73b used to correct a relative position between the optical probe 3 and the holding member 55 holding the optical probe 3.

As illustrated in FIGS. 1 and 2, the holding and rotating device 7 includes a table 71 that holds the object to be measured M, a rotation unit 72 configured to rotate the table 71 in the θZ-axis direction, which is a direction indicated by arrow 68, and a position detecting unit 73 configured to detect the position of the table 71 in a rotational direction. The position detecting unit 73 is an encoder device configured to detect rotation of the table 71 or the rotation unit 72 in the rotational axis. The holding and rotating device 7 rotates the table 71 through the rotation unit 72 on the basis of a result detected by the position detecting unit 73. The line-shaped pattern projected by the optical probe 3 can be projected onto an optional measurement target region of the object to be measured M by the holding and rotating device 7 and the probe moving device 2.

Drive of the X movement unit 50X, the Y movement unit 50Y, the Z movement unit 50Z, the first rotation unit 53, the second rotation unit 54, and the holding and rotating device 7 is controlled by the control device 4 on the basis of a result of detection by the position detecting unit 11 including an encoder device.

The optical probe 3 is supported by the holding member 55. The holding member 55 includes the first holding unit (first part or first member) 55A extending in a direction orthogonal to the rotational axis line 53a and supported by the first rotation unit 53, and a second holding unit (second part or second member) 55B provided at an end part of the first holding unit 55A toward the positive Z-axis direction and extending in parallel to the rotational axis line 53a. The end part of the first holding unit 55A towards the positive Z-axis direction is disposed on a side farther from the object to be measured M. The first holding unit 55A and the second holding unit 55B are orthogonal to each other. The optical probe 3 is supported at an end part of the second holding unit 55B toward the positive X-axis direction. The position of the rotational axis line 53a of the first rotation unit 53 is disposed closer to the object to be measured M than the optical probe 3. A counter balance 55c is provided at an end part of the first holding unit 55A closer to the object to be measured M. This configuration achieves balance of moment between the holding member 55 and the counter balance 55c with respect to the rotational axis line 53a of the first rotation unit 53.

The optical probe 3 includes a light source device 8 and an image capturing apparatus 9. The light source device 8 and the image capturing apparatus 9 are fixed by a common housing. Thus, a projection direction in which the line-shaped pattern is projected by the light source device 8, the direction of the image capturing by the image capturing apparatus 9, and a positional relation between the light source device 8 and the image capturing apparatus 9 are maintained. Accordingly, the position of the measurement target region of the object to be measured M in a three-dimensional space can be calculated, by using on a triangulation method, from the position of an image of the line-shaped pattern detected by the image capturing apparatus 9 on the basis of the projection direction of the line-shaped pattern, the image capturing direction of the image capturing apparatus 9, and the positional relation between the light source device 8 and the image capturing apparatus 9. The light source device (projection unit) 8 of the optical probe 3 is controlled by the control device 4 to project the line-shaped pattern onto a measurement region of the object to be measured M held by the holding and rotating device 7, and includes a light source 12 and an illumination optical system 13. The light source 12 according to the present embodiment includes a laser diode, for example. The light source 12 may include a solid light source such as a light-emitting diode (LED) in place of the laser diode. The amount of light projected by the light source 12 according to the present embodiment is controlled by the control device 4. Specifically, this control is performed by a light adjustment control unit 38 in the control device 4.

The illumination optical system 13 adjusts the spatial light intensity distribution of light emitted from the light source 12. The illumination optical system 13 according to the present embodiment includes a plurality of optical elements including, for example, a cylindrical lens. The illumination optical system 13 may include one optical element or a plurality of optical elements. The light emitted from the light source 12 has a spot spreading in a direction in which the cylindrical lens has a positive power, and is along a first direction pointing toward the object to be measured M from the light source device 8. As illustrated in FIG. 2, when the light source device 8 and the image capturing apparatus 9 are disposed on a surface orthogonal to the rotational axis line 53a, and light projected by the light source device 8 is emitted from the light source device 8 in a traveling direction of passing through the surface orthogonal to the rotational axis line 53a and projected onto the object to be measured M including a surface orthogonal to the emission direction from the light source device 8, the line-shaped pattern parallel to the rotational axis line 53a is obtained with its longitudinal direction along a direction parallel to the rotational axis line 53a.

The longitudinal direction of the line-shaped pattern is changed by the second rotation unit 54 described above. Efficient measurement can be performed by changing the longitudinal direction of the line-shaped pattern depending on a direction in which a surface of the object to be measured M spreads. Simultaneously, the image capturing direction of the image capturing apparatus 9 changes as well. Thus, when an object, such as a gear, having a shape including convex portions is measured, the shape of a tooth bottom can be measured by setting the image capturing direction along a tooth line.

The illumination optical system 13 may include a diffractive optical element such as CGH so that the spatial light intensity distribution of an illumination light beam L emitted from the light source 12 is adjusted through the diffractive optical element. In the present embodiment, a pattern refers to projection light having an adjusted spatial light intensity distribution. The illumination light beam L is an exemplary pattern. In the present specification, the direction of a pattern refers to a direction along the longitudinal direction of the line-shaped pattern.

The image capturing apparatus (image capturing unit) 9 includes an image sensor 20, an imaging optical system 21, a diaphragm 23, and a diaphragm driving unit 24. The illumination light beam L projected onto the object to be measured M from the light source device 8 is reflected and scattered at the surface of the object to be measured M, and at least part thereof enters into the imaging optical system 21. The imaging optical system 21 forms, on the image sensor 20, an image of the line-shaped pattern projected onto the surface of the object to be measured M by the light source device 8 together with an image of the object to be measured M. The image sensor 20 captures a picture image of the images formed through the imaging optical system 21. A picture image processing unit 25 generates picture image data from an optical signal received by the image sensor 20. The diaphragm 23 includes an opening having a variable size, and can control the quantity of light passing through the imaging optical system 21 by changing the size of the opening. The size of the opening of the diaphragm 23 is adjustable by the diaphragm driving unit 24. The diaphragm driving unit 24 is controlled by the control device 4. Specifically, this control is performed by the light adjustment control unit 38 in the control device 4.

In the imaging optical system 21, an object plane 21a is set to include the projection direction of the line-shaped pattern projected by the light source device 8, and the imaging optical system 21 and the image sensor 20 are disposed so that the object plane and a light-receiving surface 20a (image plane) of the image sensor 20 have a conjugate relation. The traveling direction of the illumination light beam L is substantially parallel to a plane including the projection direction of the illumination light beam L from the light source device 8 and the longitudinal direction of the spot shape of the illumination light beam L. Forming, along the traveling direction of the illumination light beam L, a plane having a conjugate relation with the object plane and the light-receiving surface 20a of the image sensor 20 allows an image of the pattern formed by the illumination light beam L, which is captured by the image capturing apparatus 9, to be in focus irrespective of a position at which the surface of the object to be measured M and the illumination light beam L intersect with each other.

The control device 4 controls each component of the shape measuring device 1. The control device 4 calculates the three-dimensional shape of the measurement target region of the object to be measured M by performing arithmetic processing on the basis of a result of image capturing by the optical probe 3 and position information on the probe moving device 2 and the holding and rotating device 7. Shape information in the present embodiment includes information indicating at least one of a shape, a size, an unevenness distribution, a surface roughness, and the position (coordinates) of a point on a measurement target surface related to at least part of the object to be measured M as a measurement target. The control device 4 is connected with the display device 5 and the input device 6. As illustrated in FIG. 3, the control device 4 includes a control unit 30 and a storage unit 31.

The control unit 30 includes a circuit block necessary for accurately measuring the object to be measured M. In the present embodiment, any function necessary for correctly measuring the object to be measured M may be achieved by executing a corresponding computer program by using a central processing unit. The control unit 30 includes a region-of-interest setting unit 32, a measurement range setting unit 36, a light adjustment region setting unit 37, the light adjustment control unit 38, a measurement unit 39, and an operation control unit 40.

The region-of-interest setting unit 32 sets a region of interest as a region on picture image data. This region of interest is used to restrict an image search range of the illumination light beam L to facilitate extraction of an image of the illumination light beam L projected on the object to be measured M and captured by the image sensor 20, or is used to limit an acquisition range of image brightness information of the illumination light beam L acquired for exposure control at image capturing and control of the illumination light amount of the illumination light beam L. In particular, when the object to be measured M is shaped to have a small pitch between convex portions like a gear and has a glazing surface, the surface serves as a coupled mirror, forming an image of the illumination light beam L other than a region irradiated with the illumination light beam L. This image is referred to as a multiple reflection image.

The shape measuring device according to the present embodiment achieves an effect of reducing false recognition of such a multiple reflection image or a false image generated due to any other cause as an image of the illumination light beam L by setting a region of interest to picture image data acquired by the image sensor 20.

The region-of-interest setting unit 32 receives data from the image capturing apparatus 9, and information on operation of each component from the operation control unit 40, which is specifically information on relative positions of the optical probe 3 and the object to be measured M. The region-of-interest setting unit 32 acquires, from position setting data 42 of a region of interest in the storage unit 31, position information indicating a position in a region that can be captured by the image capturing apparatus 9 (or a visual field range that can be acquired by the image sensor 20) at which a region of interest is set. The region-of-interest setting unit 32 acquires reference region-of-interest data from position setting data 44 of a reference region of interest. The region-of-interest setting unit 32 outputs position information on a region of interest set in an image capturing range by, for example, a user to the position setting data 42 of a region of interest in the storage unit 31.

The measurement range setting unit 36 sets a measurement range on the basis of the position setting data 42 of a region of interest or an instruction input from the input device 6. The measurement range setting unit 36 outputs the set measurement range to the measurement unit 39.

The light adjustment region setting unit 37 sets a light adjustment region setting allowed range and a light adjustment region on the basis of the position setting data 42 of a region-of-interest or an instruction input from the input device 6. The light adjustment region setting unit 37 outputs the set light adjustment region to the light adjustment control unit 38.

The light adjustment control unit 38 receives the light adjustment region from the light adjustment region setting unit 37. The light adjustment control unit 38 determines a light adjustment condition, for example, an operation condition at picture image data acquisition by the light source device 8 or the image capturing apparatus 9 on the basis of information on picture image data of the light adjustment region. The light adjustment control unit 38 outputs the determined light adjustment condition to the light source device 8 or the image capturing apparatus 9.

The measurement unit 39 receives the measurement range set by the measurement range setting unit 36. The measurement unit 39 receives picture image data acquired by the image capturing apparatus 9. The measurement unit 39 receives information on operation of each component from the operation control unit 40, which is specifically information on relative positions of the optical probe 3 and the object to be measured M. The measurement unit 39 detects, for the relative positions of the optical probe 3 and the object to be measured M at acquisition of the picture image data, an image (in the present embodiment, also referred to as a line light image) of a line-shaped pattern included in the measurement range of the picture image data, and measures an outer shape of the object to be measured M on the basis of the image of the pattern. The operation control unit 40 performs operation control of the probe moving device 2, the optical probe 3, and the holding and rotating device 7. The operation control unit 40 outputs operation control information to the region-of-interest setting unit 32 and the measurement unit 39.

Figure 4:
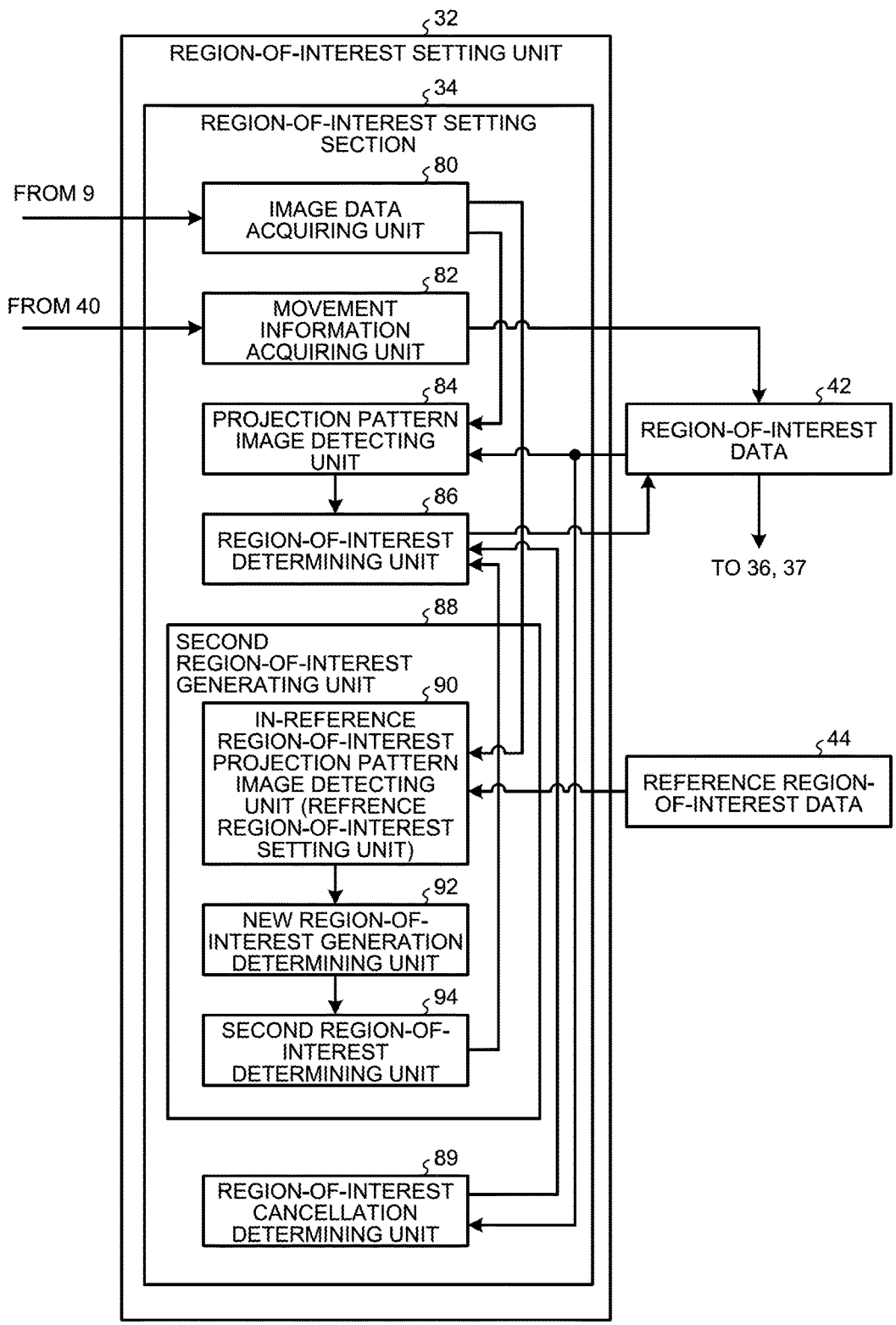
FIG. 4 is a block diagram of a schematic configuration of a region-of-interest setting unit of the control device.

FIG. 4 is a block diagram of a schematic configuration of the region-of-interest setting unit of the control device. As illustrated in FIG. 4, the region-of-interest setting unit 32 includes a region-of-interest setting unit 34. The region-of-interest setting unit 34 includes a picture image data acquiring unit 80, a movement information acquiring unit 82, a projected pattern image detecting unit 84, a region-of-interest determining unit 86, and a second region-of-interest generating unit 88.

The picture image data acquiring unit 80 acquires picture image data captured by the image capturing apparatus 9. The movement information acquiring unit 82 acquires drive information on the probe moving device 2, the optical probe 3, and the holding and rotating device 7 from, for example, an encoder of each unit in the operation control unit 40, and detects movement of the current measurement target region of the optical probe 3. For example, an amount and a direction in which the measurement target region is shifted from the last picture image acquisition are calculated.

A projection pattern image detecting unit 84 acquires the position setting data 42 of a region of interest, and acquires picture image data from the picture image data acquiring unit 80. The region of interest is a region of interest on the picture image data. The number of regions of interest may be set to be one or more for one piece of picture image data. The projection pattern image detecting unit 84 detects the position of an image of the pattern on the picture image data only from the region of interest of the picture image data.

The region-of-interest determining unit 86 determines, by using, as a reference, the position of the pattern on the picture image data detected by the projection pattern image detecting unit 84, the outline of a region of interest at a position separated by a predetermined number of pixel pitch intervals around the position of the image of the pattern. When a plurality of line lights on the picture image data detected by the projection pattern image detecting unit 84 are each at a position separated from another line light by a set distance (the number of pixels) or more, the region-of-interest determining unit 86 determines each of a plurality of regions as a region of interest. The number of regions of interest provided in the picture image data is not particularly limited, but may be one, two, three or larger. When a second region of interest is determined by the second region-of-interest generating unit 88, the region-of-interest determining unit 86 determines a region of interest to be the second region of interest different from a region of interest set on the basis of the position of the pattern.

In the present embodiment, the region-of-interest determining unit 86 is set as follows. A region of interest is set by setting an outer periphery to be at positions separated by a predetermined distance in all directions around the position of an image of the pattern detected by the projection pattern image detecting unit 84. As for the distance used to set the outer periphery, the distance by which the measurement target region moves on the object to be measured M by a timing when the next image is captured by the image capturing apparatus 9 is calculated and a distance information for determining the outer periphery of the region of interest is set on the basis of the result of this calculation. For this purpose, the movement information acquiring unit 82 acquires drive information on the X movement unit 50X, the Y movement unit 50Y, the Z movement unit 50Z, the first rotation unit 53, the second rotation unit 54, and the holding and rotating device 7.

In the present invention, when the moving direction of line light on the picture image data can be estimated, the region of interest may be moved on the picture image data in the moving direction of the line light by using the position of the line light as a reference, instead of setting a region of interest by extending its range in all directions relative to the position of an image of the pattern. When the region is extended around the image of the pattern, a region of interest may be set to have its outer periphery set at a position further separated from the image of the pattern in the moving direction of line light than in any other direction.

The following describes the second region-of-interest generating unit 88. In the second region-of-interest generating unit 88, when a shape including a plurality of indented structures, such as the shape of a gear is measured, a plurality of images of the line-shaped pattern are generated. In the present invention, a determination reference is provided to generate the second region of interest. The second region-of-interest generating unit 88 is provided in the present embodiment, and the second region-of-interest generating unit 88 includes an in-reference region-of-interest projection pattern image detecting unit 90, a new region-of-interest generation determining unit 92, and a second region-of-interest determining unit 94.

Position setting data 44 of a reference region of interest can be specified by the user in advance, and is a region set in a visual field that can be captured by the image capturing apparatus 9. This reference region of interest can be used in a manner that is the same as the position setting data 42 of a region of interest described above, and is used to determine whether to produce a new region of interest.

Next, the in-reference region-of-interest projection pattern image detecting unit 90 acquires an existence state of a pattern image including, for example, existence of a pattern image and the position of a pattern image from picture image data acquired from the picture image data acquiring unit 80, from image capturing information in a region of interest set on the basis of the position setting data 44 of the reference region of interest.

The in-reference region-of-interest projection pattern image detecting unit 90 includes a function of a reference region-of-interest setting unit configured to determine a pixel range of the image sensor 20 on the basis of the position setting data 44 of the reference region of interest, and a reference region of interest on picture image data.

When a pattern image is a line light image having a line-shaped intensity distribution, the in-reference region-of-interest projection pattern image detecting unit 90 measures the length of line light image in the reference region of interest of the picture image data.

The length of an image of the line-shaped pattern can be measured by, for example, a method as follows. For example, when a vertical direction on picture image data is set to be the longitudinal direction of the line-shaped pattern, detection will be performed whether there is a pixel at which a change in the brightness value indicates a local maximum for each image of the line-shaped pattern sequentially downward or upward along a direction substantially orthogonal to the image of the line-shaped pattern (hereinafter referred to as a local maximum pixel search row). In this manner, when the detection is sequentially performed downward or upward on the picture image data, the length can be measured by evaluating how long pixels detected at local maximum pixel search rows continuously exist. The local maximum pixel search row is in a direction along an epipolar line. A direction in which the local maximum pixel search row extends is a detection direction. The existence state of the length of an image of the line-shaped pattern is determined by evaluating a length in which local maximum pixels continuously exist in this manner.

A pixel position at which brightness detected in this manner indicates a local maximum needs to be searched, and thus an array direction of pixels of the image sensor 20 may be substantially aligned with the direction of the epipolar line.

The new region-of-interest generation determining unit 92 determines whether to generate the second region of interest, which is a new region of interest, on the basis of the existence state of the pattern detected by the in-reference region-of-interest projection pattern image detecting unit 90, for example, the length of line light image.

If it is determined by the new region-of-interest generation determining unit 92 that the second region of interest is to be generated, the second region-of-interest determining unit 94 determines a region in which the second region of interest is to be produced. The second region-of-interest determining unit 94 according to the present embodiment determines a region same as the reference region of interest to be a region in which the second region of interest is produced. The second region-of-interest determining unit 94 may set a region of interest around the position of line light image positioned in the reference region of interest by a method similarly to a method of setting a region of interest performed by the region-of-interest setting unit 34 described above.

A region-of-interest cancellation determining unit 89 determines whether to cancel a set region of interest on the basis of the position or size of a region of interest. When a region of interest set around a pattern existing in screen data based on a moving distance estimated by a timing of the next image capturing by the image capturing apparatus 9 is set outside of a visual field of the screen data, the region of interest cancellation determining unit 89 cancels this region of interest. Specifically, if the area of a region of interest set on picture image data is smaller than a threshold area, the region-of-interest cancellation determining unit 89 cancels this region of interest.

In this manner, region-of-interest information set by the region-of-interest setting unit 32 is used by the measurement range setting unit 36 and the light adjustment region setting unit 37 to be described next. The measurement range setting unit 36 sets a region of interest set by the region-of-interest setting unit 32 to be a position detecting region of a pattern image used to calculate position data of a measurement region of the object to be measured M. A measurement range is a range in which the position of an image of the pattern is detected in an image of the object to be measured M captured by the picture image processing unit 25. When the position of the pattern is detected from picture image data, a brightest pixel value in a direction same as a direction (detection direction) in which a local maximum pixel described above is detected for each pixel column among picture image data captured by the image sensor 20 for a line light image. In this case, instead of searching thoroughly from one end of a pixel column of the picture image data to the other end thereof, the brightest pixel value is searched for each pixel column only in a range set as a measurement range. Processing of searching the brightest pixel value for each pixel column only in the set range is executed similarly when the pattern is detected in the light adjustment region.

The light adjustment region setting unit 37 sets a light adjustment region. The light adjustment region is a region in which the brightness of a captured image is detected in the image capturing range of the image sensor 20. The light adjustment region in the present embodiment, which will be described later in detail, changes with a region of interest. In this manner, the range of brightness information referred to when exposure control of the image sensor 20 and irradiation light quantity control of the illumination light beam L are performed can be limited depending on a point group generation region, and influence of, for example, harmful regular reflection light can be minimized.

The light adjustment region setting unit 37 according to the present embodiment sets the light adjustment region setting allowed range on the basis of position information of the measurement range, and sets the light adjustment region on the basis of the set light adjustment region setting allowed range. The light adjustment region setting allowed range is a range set on the basis of the position information of the measurement range in the image capturing range of the image capturing unit, and is a range allowing setting of the light adjustment region. The light adjustment region setting unit 37 may set the light adjustment region setting allowed range on the basis of, in addition to the measurement range, at least one of data stored in the storage unit 31 and input data received through the input device 6. The light adjustment region setting unit 37 may set the light adjustment region on the basis of, in addition to the light adjustment region setting allowed range, at least one of the data stored in the storage unit 31 and the input data received through the input device 6.

The light adjustment control unit 38 acquires the pixel value of a brightest pixel for each pixel column detected in the light adjustment region, and outputs, to the light source 12, for example, a signal for controlling the amount of projected light or a signal for controlling an exposure time at image capturing by the image sensor 20, depending on the magnitude of the acquired pixel value. As for the control of the exposure time, an exposure time when one piece of picture image data is acquired may be controlled or a time in which an imaging plane is exposed by a mechanical shutter (not illustrated) incorporated in the image sensor 20 may be controlled. Accordingly, the light adjustment control unit 38 controls, depending on the magnitude of the acquired pixel value, the amount of light projected by the projection unit, the quantity of light received by the image capturing unit, exposure when picture image data is acquired by the image capturing unit, or input and output characteristics (a sensitivity or an amplification ratio of a signal detected by each pixel of the image sensor, for example) of the image capturing unit, which are various kinds of conditions (light adjustment condition) when picture image data is acquired by the optical probe 3.

The measurement unit 39 measures the shape of the object to be measured on the basis of the position of a pattern image projected by the light source device 8, which is positioned in the measurement range of picture image data, and position information on the X movement unit 50X, the Y movement unit 50Y, the Z movement unit 50Z, the first rotation unit 53, the second rotation unit 54, each movement member of the holding and rotating device 7 when the picture image data is acquired. The measurement unit 39 captures a picture image of the measurement target region through the image capturing apparatus 9 while sequentially moving a position at which the pattern is projected by relatively moving the optical probe 3 and the object to be measured through the probe moving device 2 and the holding and rotating device 7. Position information on the probe moving device 2 and the holding and rotating device 7 is acquired from the position detecting unit 11 at a timing of the image capturing by the image capturing apparatus 9. The measurement unit 39 calculates a position at which the pattern is projected on the object to be measured M on the basis of the position information of the probe moving device 2 and the holding and rotating device 7 from the position detecting unit 11 acquired at the timing of the image capturing by the image capturing apparatus 9, and an image capturing signal related to a picture image of an image of the pattern in the measurement range acquired by the image capturing apparatus 9, and outputs shape data of the object to be measured M. For example, the shape measuring device 1 sets the timing of the image capturing by the image capturing apparatus 9 to be at a fixed interval, and controls the moving speeds of the probe moving device 2 and the holding and rotating device 7 on the basis of measurement point interval information input through the input device 6.

The operation control unit 40 controls operation of components of the shape measuring device 1, including the probe moving device 2, the optical probe 3, and the holding and rotating device 7. The operation control unit 40 performs operation control of the probe moving device 2, the optical probe 3, and the holding and rotating device 7 on the basis of operation control information produced by the control unit 30. The control unit 30 controls picture image acquiring operation by the optical probe 3.

The storage unit 31 is a storage device, such as a hard disk or a memory, configured to store therein various kinds of computer programs and data. The storage unit 31 stores therein the position setting data 42 of a region of interest, the position setting data 44 of the reference region of interest, a condition table 46, a shape measuring program 48, and specification data 49. The storage unit 31 stores therein, in addition to these computer programs and data, various kinds of computer programs and data used for operation control of the shape measuring device 1.

The position setting data 42 of a region of interest stores therein information on a region of interest on picture image data, and information on relative positions of the optical probe 3 and the object to be measured M in association with each other. Information on a region of interest set by the region-of-interest setting unit 32 and information on relative positions at the setting are written in association with each other as the region-of-interest data 42.

The position setting data 44 of the reference region of interest stores therein information on a reference region of interest corresponding to an outer edge of a picture image. The reference region of interest is information on a region having a fixed position relative to a picture image. In the present embodiment, the reference region of interest is one region, but may include a plurality of regions.

The condition table 46 stores therein a condition set by the control unit 30 and various kinds of conditions input in advance. The shape measuring program 48 stores therein a computer program that executes processing at each component of the control device 4. Accordingly, the control device 4 performs control to capture a pattern image projected onto the object to be measured M while sequentially moving the measurement target region by sequentially reproducing operation of each component described above through execution of a computer program stored in the shape measuring program 48. The shape measuring program 48 includes both of a computer program for measuring the object to be measured M, which is generated by the control unit 30 described above, and a computer program for allowing the control unit 30 to generate this computer program. The shape measuring program 48 may be stored in the storage unit 31 in advance, but the present invention is not limited thereto. The shape measuring program 48 may be read from a storage medium storing therein the shape measuring program 48 and stored in the storage unit 31, or may be acquired from the outside through communication. The specification data 49 stores therein, for example, condition data that allows definition of designing data, CAD data, and the shape of the object to be measured M.

The control device 4 controls the drive unit 10 of the probe moving device 2 and the rotation unit 72 of the holding and rotating device 7 so that the relative positions of the optical probe 3 and the object to be measured M have a predetermined positional relation. The control device 4 controls, for example, light adjustment of the optical probe 3 so as to capture a picture image of the line-shaped pattern projected on the object to be measured M at an optimum quantity of light. The control device 4 acquires information on the position of the optical probe 3 from the position detecting unit 11 of the probe moving device 2, and acquires, from the optical probe 3, data (captured picture image data) indicating a picture image obtained by capturing a measurement region. Then, the control device 4 acquires, through calculation, shape information related to the three-dimensional shape of the measurement target by associating the position of the surface of the object to be measured M and the position of the optical probe 3 that is obtained from the captured picture image data in accordance with the position of the optical probe 3, the projection direction of line light, and the image capturing direction of the image capturing apparatus.

The display device 5 includes, for example, a liquid crystal display device or an organic electroluminescence display device. The display device 5 displays measurement information related to measurement of the shape measuring device 1. The displayed measurement information may be, for example, picture image data captured by the image sensor 20, information indicating the position of a region of interest (or measurement region) set in the image capturing region of the image sensor 20, information indicating the position of the light adjustment region, and information indicating the position of the light adjustment region setting allowed range. Position information on the region of interest (or the measurement region), the light adjustment region, and the light adjustment region setting allowed range is displayed on picture image data captured by the image sensor 20 in a superimposing manner. In the present embodiment, the image capturing apparatus 9 performs image capturing at a predetermined image capturing rate while relatively moving the object to be measured M and the optical probe 3, and thus a pattern image moves along with relative movement of the optical probe 3 and the object to be measured M. The region of interest following this movement may be displayed with a halftone frame or in color display.

In addition, for example, setting information indicating setting related to measurement, progress information indicating progress of measurement, and shape information indicating a result of measurement are included. The display device 5 according to the present embodiment is supplied with picture image data indicating measurement information from the control device 4, and displays a picture image indicating measurement information in accordance with the picture image data.

The input device 6 includes various kinds of input devices such as a keyboard, a mouse, a joystick, a track ball, and a touchpad. The input device 6 receives input of various kinds of information to the control device 4. The various kinds of information includes, for example, instruction information indicating an instruction (command) causing the shape measuring device 1 to start measurement, setting information related to measurement by the shape measuring device 1, and operation information for manually operating at least part of the shape measuring device 1.

In the shape measuring device 1 according to the present embodiment, the control device 4 includes the control unit 30 and the storage unit 31. The control device 4 is connected with the display device 5 and the input device 6. The control device 4, the display device 5, and the input device 6 may be, for example, computers connected with the shape measuring device 1, host computers included in a building in which the shape measuring device 1 is installed, or computers placed at positions separated from the shape measuring device 1, instead of the building in which the shape measuring device 1 is installed, and connected with the shape measuring device 1 through a communication unit such as the Internet. The control device 4, the display device 5, and the input device 6 may be held at different places. For example, the shape measuring device 1 may be supported, for example, inside the optical probe 3, separately from a computer including the input device 6 and the display device 5. In this case, information acquired by the shape measuring device 1 is connected with the computer through the communication unit.

Figure 5:
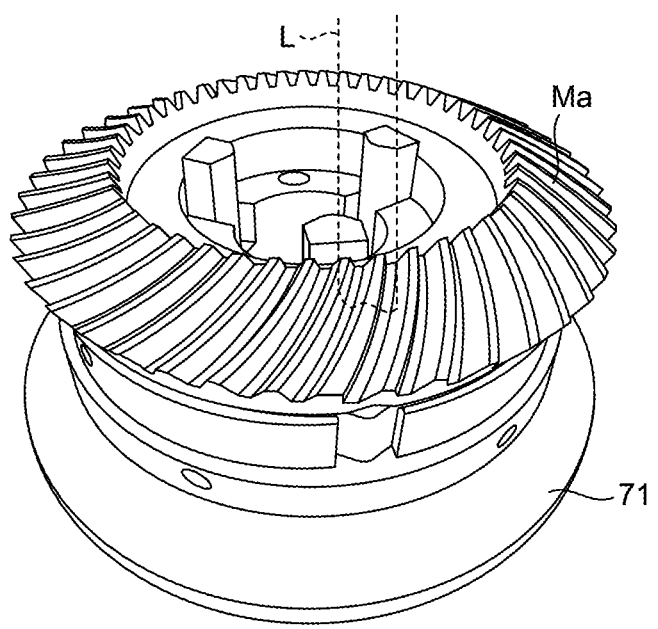
FIG. 5 is an explanatory diagram for explaining a measuring operation performed by the shape measuring device according to the present embodiment.
Figure 6:
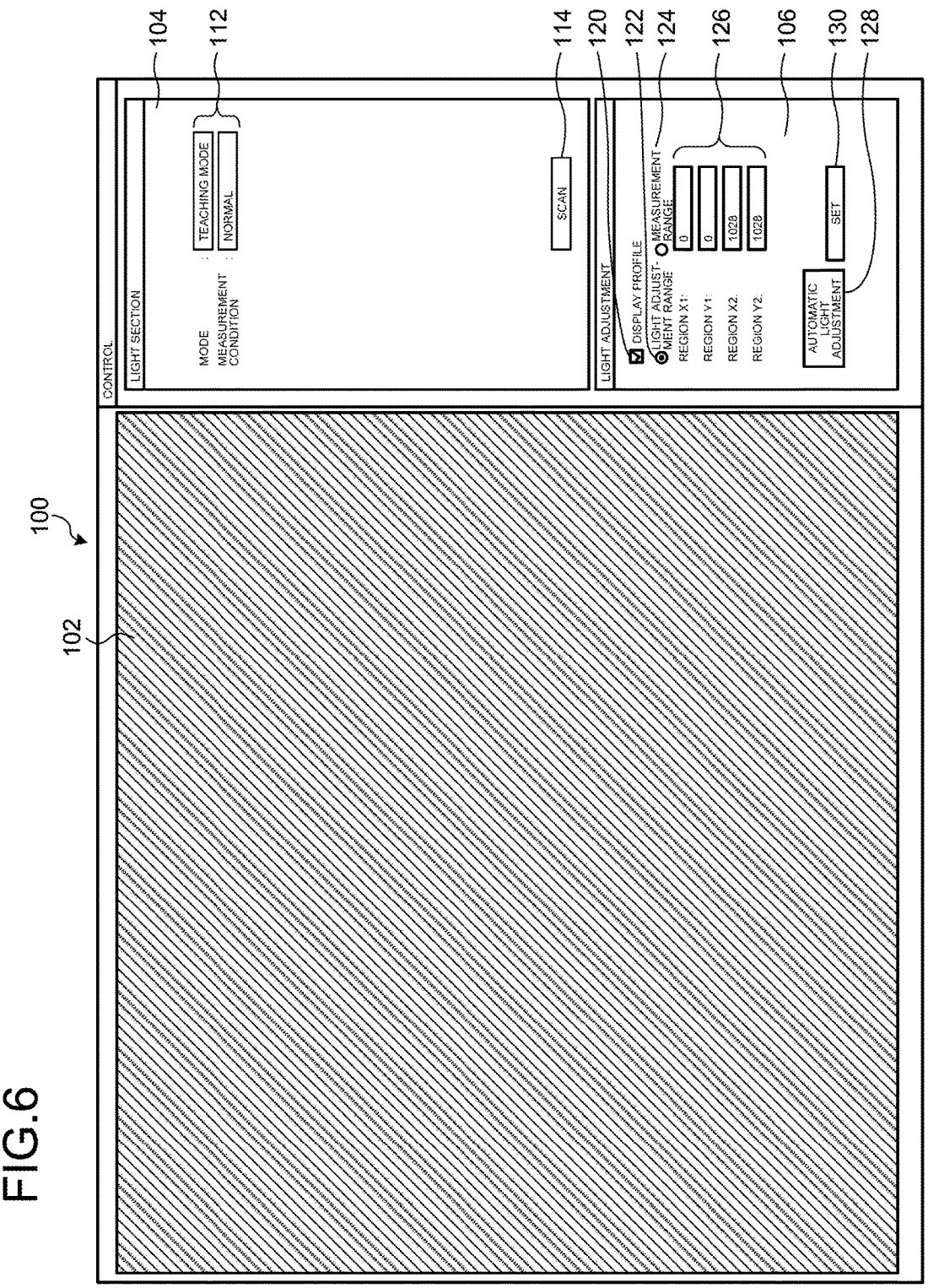
FIG. 6 is an explanatory diagram for explaining an exemplary screen displayed on the shape measuring device according to the present embodiment.
Figure 7:
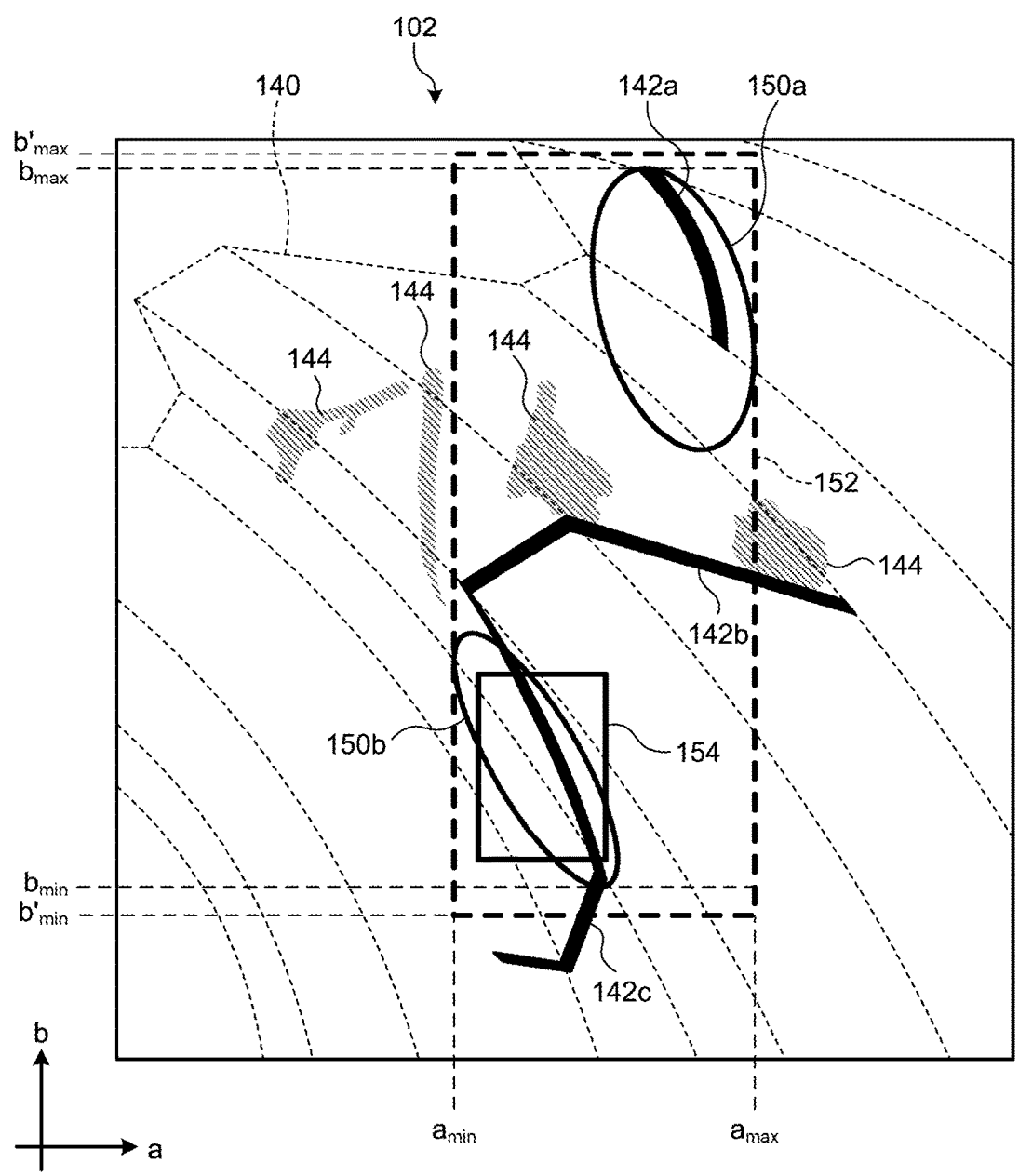
FIG. 7 is an explanatory diagram for explaining the measuring operation performed by the shape measuring device according to the present embodiment.
Figure 8:
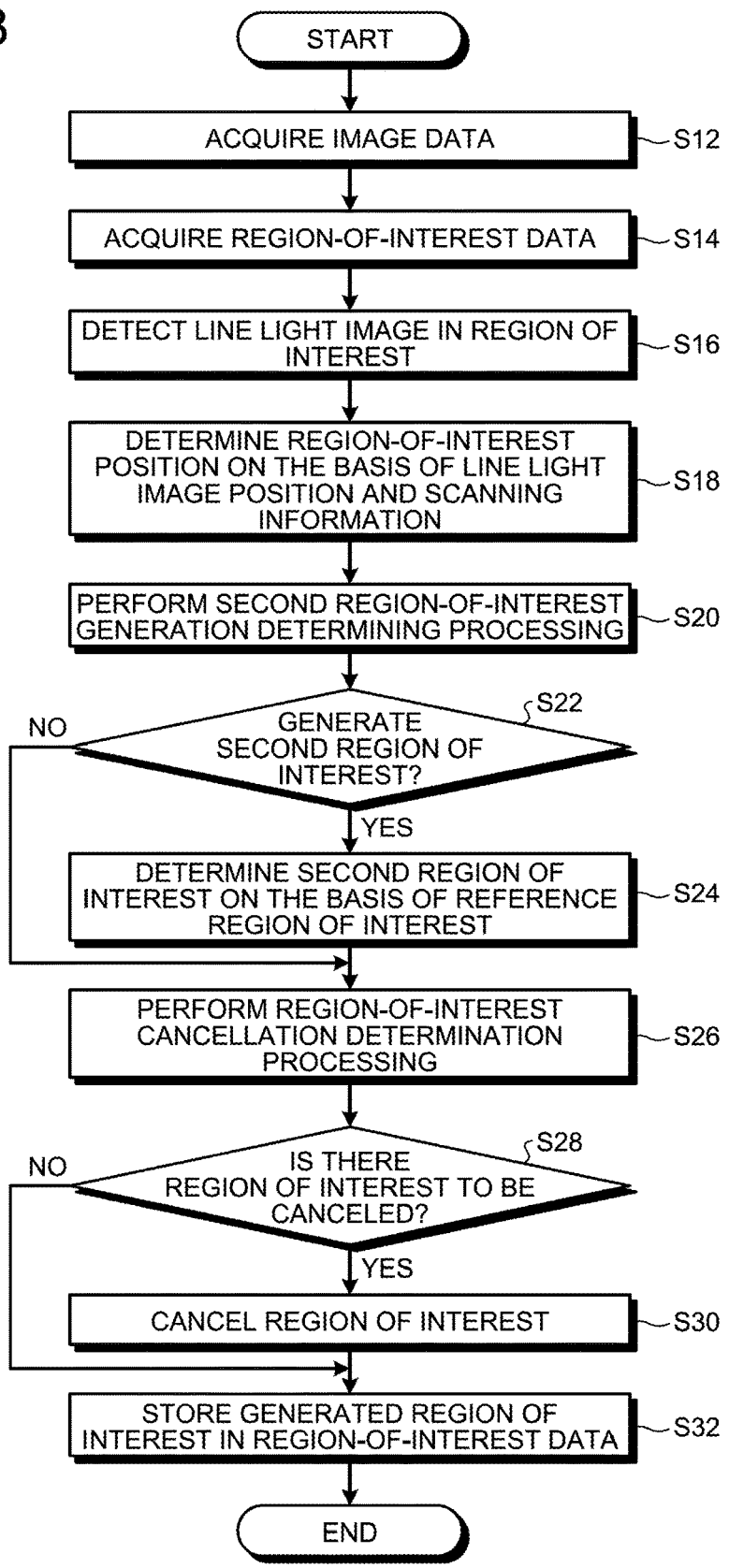
FIG. 8 is a flowchart of an exemplary region-of-interest setting operation performed by the shape measuring device according to the present embodiment.
Figure 9:
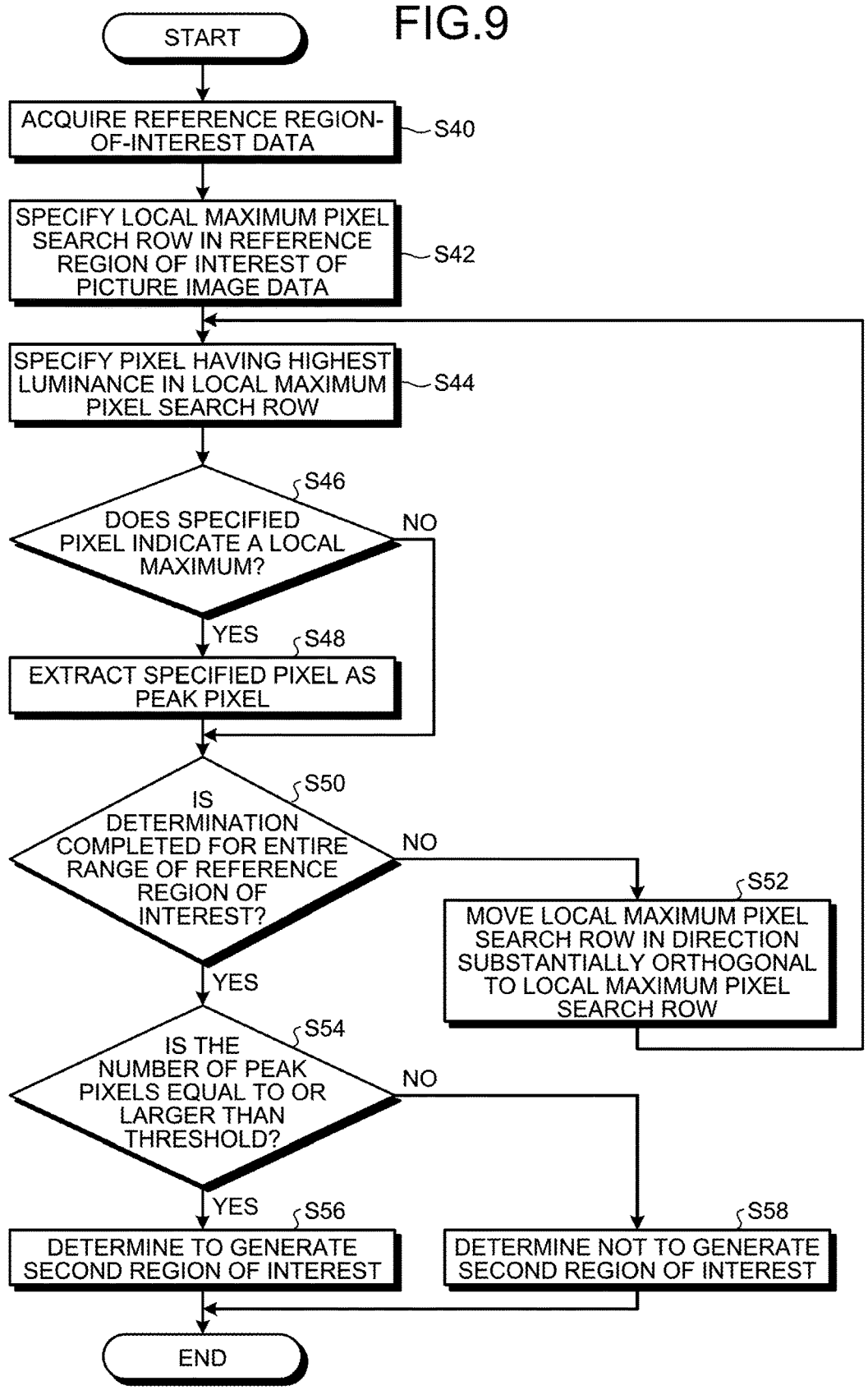
FIG. 9 is a flowchart of exemplary determination processing of generation of a second region of interest performed by the shape measuring device according to the present embodiment.
Figure 10:
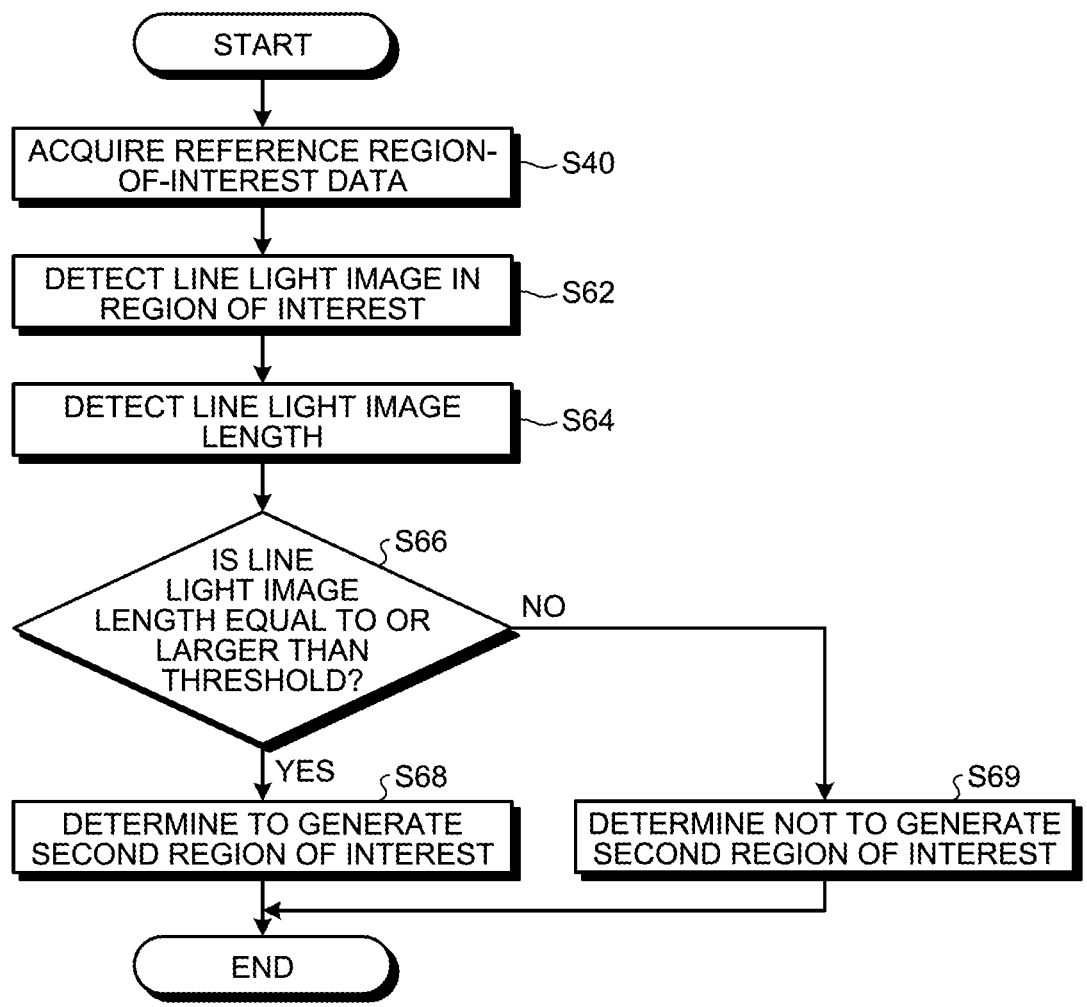
FIG. 10 is a flowchart of exemplary determination processing of generation of the second region of interest performed by the shape measuring device according to the present embodiment.
Figure 11:
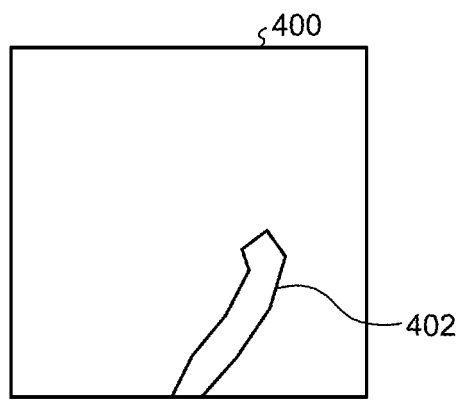
FIG. 11 is an explanatory diagram illustrating exemplary reference region-of-interest data.
Figure 12:
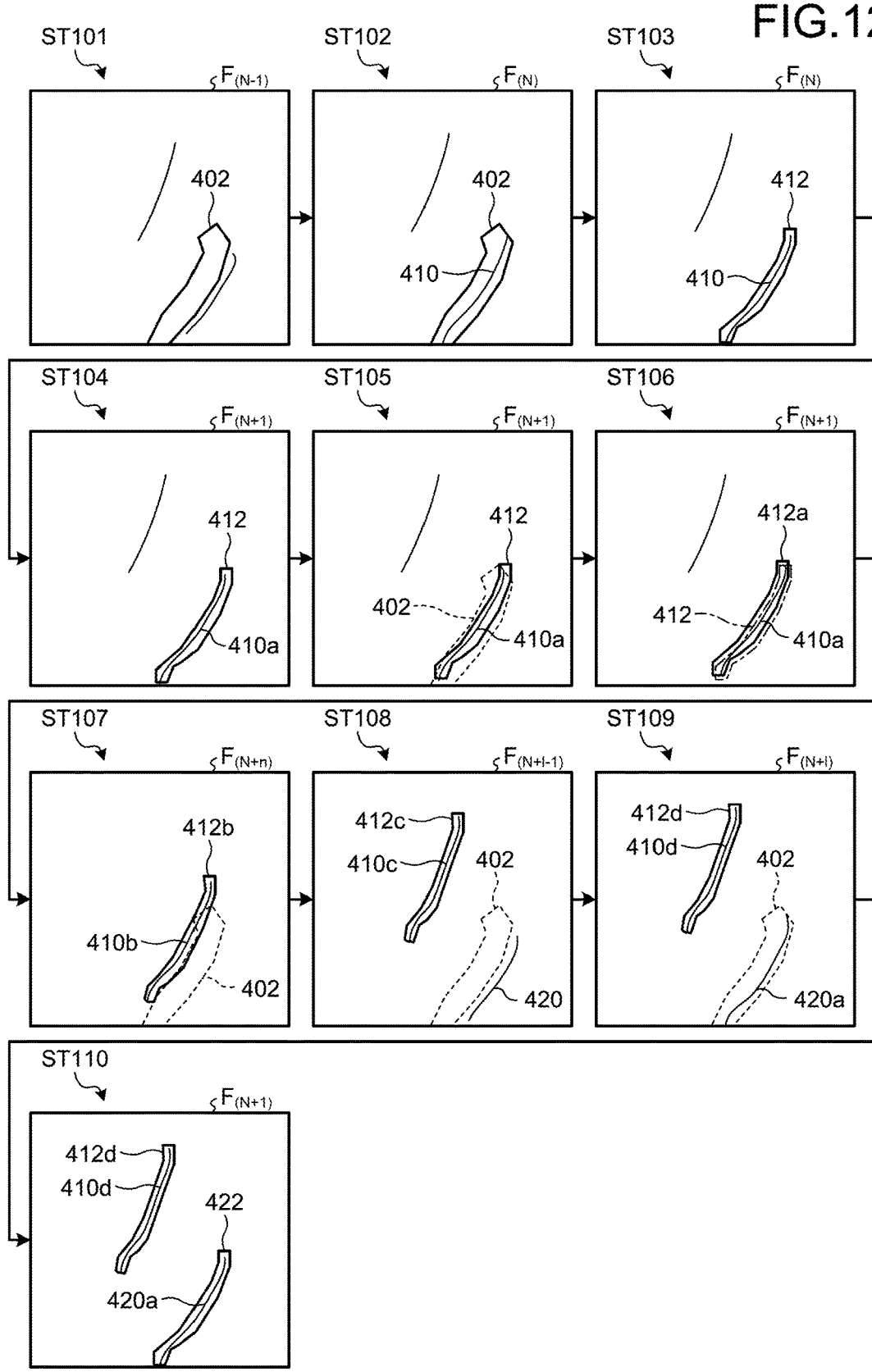
FIG. 12 is an explanatory diagram for explaining an exemplary region-of-interest setting operation.
Figure 13:
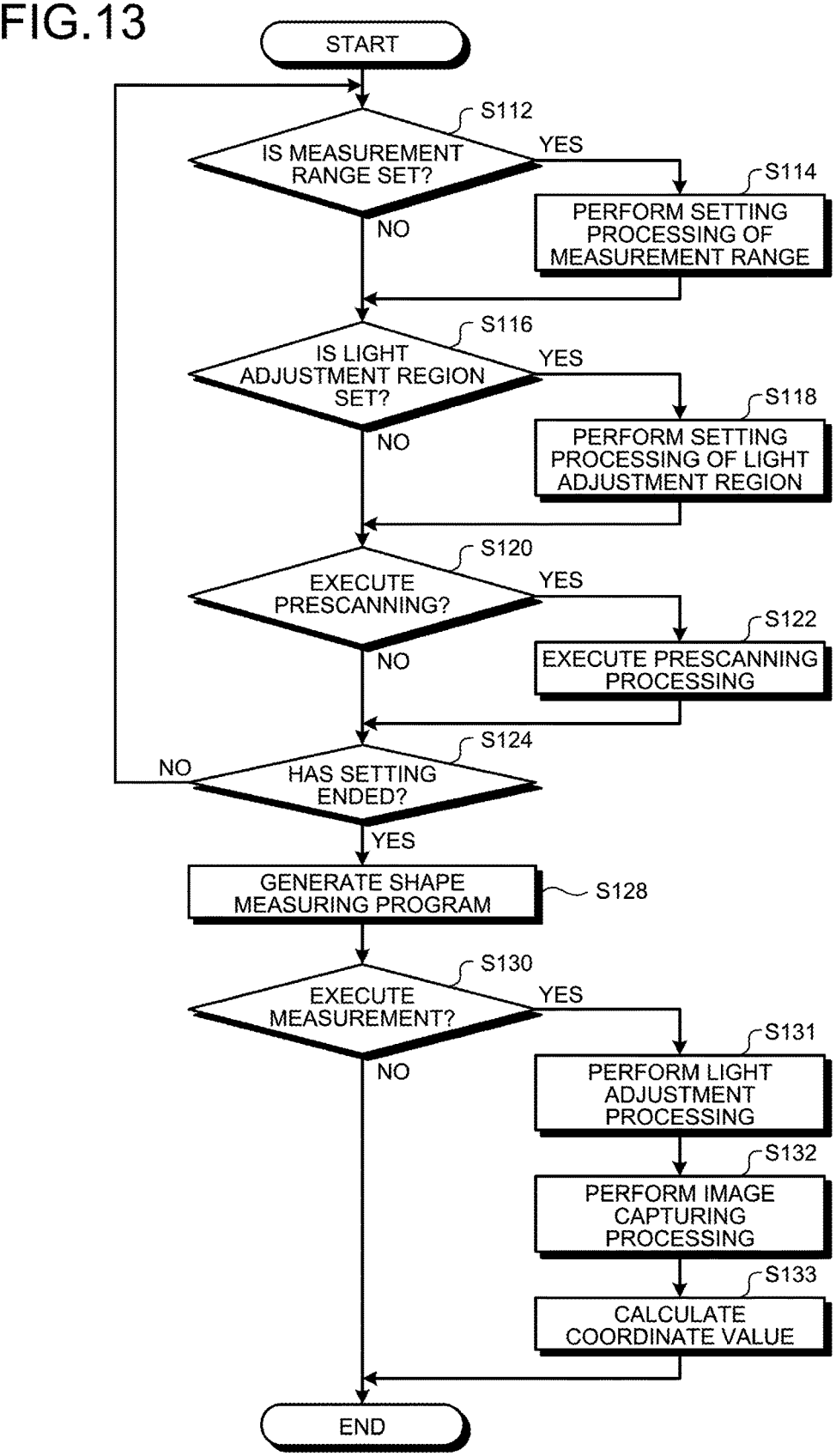
FIG. 13 is a flowchart of an exemplary measuring operation performed by the shape measuring device according to the present embodiment.

The following describes, with reference to FIGS. 5 to 13, exemplary operation of measuring the shape of an object to be measured through the shape measuring device 1 having the above-described configuration. FIG. 5 is an explanatory diagram for explaining measuring operation performed by the shape measuring device according to the present embodiment. FIG. 6 is an explanatory diagram for explaining an exemplary screen displayed by the shape measuring device according to the present embodiment. FIG. 7 is an explanatory diagram for explaining the measuring operation performed by the shape measuring device according to the present embodiment. FIG. 8 is a flowchart of exemplary region-of-interest setting operation performed by the shape measuring device according to the present embodiment. FIGS. 9 and 10 are each a flowchart of exemplary determination processing of generation of the second region of interest performed by the shape measuring device according to the present embodiment. FIG. 11 is an explanatory diagram illustrating exemplary reference region-of-interest data. FIG. 12 is an explanatory diagram for explaining an exemplary region-of-interest setting operation. FIG. 13 is a flowchart of an exemplary measuring operation performed by the shape measuring device according to the present embodiment.

The following description will be made on an example in which the shape measuring device measures the shape of an object to be measured Ma having a repeated shape formed in a circumferential direction as illustrated in FIG. 5. The shape measuring device 1 measures the shape of the object to be measured Ma by projecting the illumination light beam L onto a tooth as one unit of the repeated shape of the object to be measured Ma and acquiring a picture image of a pattern projected on the object to be measured Ma. The shape measuring device 1 according to the present embodiment can measure the shape of one tooth by acquiring the picture image of the pattern projected on the object to be measured Ma while moving the illumination light beam L along the direction of a tooth line. The shape measuring device 1 can measure the shape of the object to be measured Ma by sequentially measuring the shape of each tooth of the object to be measured Ma. The object to be measured Ma is a bevel gear in which teeth designed to have substantially identical shapes are formed at a predetermined interval in the circumferential direction. Although the object to be measured Ma is a bevel gear in this example, the shape measuring device 1 according to the present embodiment can measure the shapes of objects having various kinds of shapes as objects to be measured. It is clear that, when the object to be measured Ma is a gear, the kind of the gear is not particularly limited. Examples of a measurement target as the object to be measured Ma of the shape measuring device 1 include, in addition to a bevel gear, a spur gear, a helical gear, a double helical gear, a worm gear, a pinion, and a hypoid gear. The shape measuring device 1 is not limited to measurement of the shape of one tooth and measurement of the entire shape of the object to be measured Ma, but may measure the shape of an optional one point of the object to be measured Ma.

When operational, the shape measuring device 1 displays a screen 100 illustrated in FIG. 6. The screen 100 is displayed in a mode for setting a condition of measurement of the shape of the object to be measured Ma, for example, a teaching mode. The screen 100 includes a picture image window 102 and windows 104 and 106.

As illustrated in FIG. 7, the picture image window 102 displays a picture image captured and acquired by the image capturing apparatus 9. The picture image displayed on the picture image window 102 is a picture image of the entire image capturing range of the image capturing apparatus 9. The picture image displayed on the picture image window 102 includes an outer shape 140 of the object to be measured Ma, patterns 142a, 142b, and 142c formed by projecting the illumination light beam L onto the outer shape 140, and a bright line 144 caused by multiple reflection or diffuse reflection of the illumination light beam L when projected onto the outer shape 140.

The picture image window 102 displays, over the picture image, measurement ranges 150a and 150b, a light adjustment region setting allowed range 152, and a light adjustment region 154. The measurement ranges 150a and 150b and the light adjustment region setting allowed range 152 are regions set by the measurement range setting unit 36. The light adjustment region 154 is a region set by the light adjustment region setting unit 37. The light adjustment region setting allowed range 152 illustrated in FIG. 7 includes the entire measurement ranges 150a and 150b and is a range shaped in a rectangle circumscribing the measurement ranges 150a and 150b. The light adjustment region setting allowed range 152 is a range shaped in a rectangle having sides along a longitudinal direction of an image of the line-shaped pattern formed when the illumination light beam L is projected onto the object to be measured Ma having a flat and horizontal surface, and along a direction orthogonal to the longitudinal direction. The light adjustment region 154 is a range included in the light adjustment region setting allowed range 152.

The window 104 includes a measurement condition column 112 and a button 114. The measurement condition column 112 displays information such as a method of acquiring a shape by using the light-section method, a scanning speed of the illumination light beam L, a distance pitch as an interval at which picture image data is acquired, a measured distance, and a relative moving distance between the optical probe 3 and the object to be measured Ma in each direction. When various kinds of conditions are updated, a control device 4 updates the information displayed in the measurement condition column 112. The button 114 is a button operated when prescanning processing or scanning processing (measurement processing) to be described later is started. When it is detected that the button 114 is operated by input through the input device 6, the control unit 30 executes the prescanning processing or the scanning processing (measurement processing).

The window 106 includes a check box 120 for selecting whether to perform display of various profiles related to displayed picture image data, a light adjustment region selecting point 122, a measurement range selecting point 124, a range column 126, and buttons 128 and 130. The check box 120 is a box for selecting whether to display the profile and histogram of the quantity of light of a picture image. The histogram is a distribution of a maximum brightness value for each column of the image sensor produced by extracting a peak value in a width direction of a pattern on a line for the column. If the check box 120 is checked, the control unit 30 displays, over the picture image window 102, histograms of a light quantity distribution and a maximum brightness value distribution of the picture image. If the light adjustment region selecting point 122 is checked, the range column 126 displays coordinate positions on a diagonal line of the range of the light adjustment region. If the measurement range selecting point 124 is checked, a measurement range that is a measurement region in which a picture image is acquired by the image capturing apparatus 9 can be set by using a rectangle. The range of the measurement region is displayed by the range column 126 as coordinate positions on a diagonal line of the measurement region. The button 128 is a button operated when automatic light adjustment processing is started. The button 130 is a button operated to perform setting of a region or a range when the light adjustment region selecting point 122 or the measurement range selecting point 124 is selected.

The following describes, with reference to FIG. 8, operation of setting a region of interest used to measure the shape of an object to be measured, which is achieved by performing arithmetic processing at the control unit 30 of the shape measuring device 1 having the above-described configuration by using the central processing unit. The control unit 30 of the shape measuring device 1 executes the processing illustrated in FIG. 8, for example, when the teaching mode is selected. Other processing to be described later is achieved by executing processing at each component of the control unit 30 on the basis of a computer program stored in the storage unit. The processing illustrated in FIG. 8 is achieved by executing processing at the region-of-interest setting unit 32 of the control unit 30. The control unit 30 sets a region of interest at each position at which the shape of the object to be measured N is measured, by executing the processing illustrated in FIG. 8 for each position at which a pattern image is projected while relatively moving the optical probe 3 and the object to be measured.

The control unit 30 acquires, through the picture image data acquiring unit 80, picture image data captured by the image capturing apparatus 9 (step S12). After having acquired the picture image data, the control unit 30 reads region-of-interest data stored in the region-of-interest data 42 through the projection pattern image detecting unit 84 (step S14). The control unit 30 reads region-of-interest data set on the basis of a picture image captured before the optical probe 3 and the object to be measured are relatively moved. At the start of the processing, the control unit 30 reads initially set region-of-interest data. The initially set region-of-interest data may be set through input by the user.

Next, the control unit 30 detects a line light image in a region of interest through the projection pattern image detecting unit 84 (step S16). After having detected the position of the line light image, the control unit 30 determines the position of the region of interest on the basis of the position of the line light image thus detected and information (scanning information) on a distance by which the measurement target region is shifted by the next image capturing at the image capturing apparatus 9 (step S18). This shift distance is calculated on the basis of information on movement of the optical probe input in the teaching mode and information on a rotation angle of the holding and rotating device 7. The shift distance is not a distance on the object plane of the image capturing apparatus 9 but is calculated through conversion into a shift distance on the imaging plane of the image capturing apparatus 9.

After having determined the position of the region of interest, the control unit 30 performs second region-of-interest generation determining processing (step S20).

The following describes the second region-of-interest generation determining processing with reference to FIG. 9. The control unit 30 acquires reference region-of-interest data from the position setting data 44 of the reference region of interest through the in-reference region-of-interest projection pattern image detecting unit 90 (step S40). After having acquired the reference region-of-interest data, the control unit 30 specifies a local maximum pixel search row in the reference region of interest of the picture image data through the in-reference region-of-interest projection pattern image detecting unit 90 (step S42). The control unit 30 specifies, through the in-reference region-of-interest projection pattern image detecting unit 90, a pixel having a highest luminance in the local maximum pixel search row (step S44), and determines whether the specified pixel in the local maximum pixel search row is a pixel indicating a local maximum (step S46). The in-reference region-of-interest projection pattern image detecting unit 90 detects whether the brightness value has a local maximum at the particular pixel by detecting a change in the brightness value between a particular pixel and a pixel adjacent to the particular pixel in the local maximum pixel search row.

If it is determined that the specified pixel indicates a local maximum (Yes at step S46), the control unit 30 extracts the specified pixel as a peak pixel (step S48). If it is determined that the specified pixel does not indicate a local maximum (No at step S46) or if the processing at step S48 is performed, the control unit 30 determines whether the determination through the in-reference region-of-interest projection pattern image detecting unit 90 is completed for the entire range of the reference region of interest (step S50).

If it is determined that the determination is not completed for the entire range of the reference region of interest (No at step S50), the control unit 30 moves the local maximum pixel search row in a direction substantially orthogonal to the local maximum pixel search row (step S52) and returns to step S44. Specifically, the control unit 30 moves the position of the local maximum pixel search row as a reference for detection of a peak pixel from an upper side to a lower side of the picture image data or from the lower side to the upper side, and performs the above-described processing again.

If it is determined that the determination is completed for the entire range of the reference region of interest (Yes at step S50), the control unit 30 determines, through the new region-of-interest generation determining unit 92, whether the number of peak pixels is equal to or larger than a threshold (step S54).

If it is determined that the number of peak pixels is equal to or larger than the threshold (Yes at step S54), the control unit 30 determines to generate the second region of interest (step S56). If it is determined that the number of peak pixels is smaller than the threshold (No at step S54), the control unit 30 determines not to generate the second region of interest (step S58). The new region-of-interest generation determining unit 92 further determines whether a region of interest is already set for the detected line light image on the basis of information on a determined region of interest, and determines not to generate the second region of interest if a region of interest is set for the line light image.

The second region-of-interest generating unit 88 may detect the line light image through the in-reference region-of-interest projection pattern image detecting unit 90, and determine, through the new region-of-interest generation determining unit 92, whether to generate the second region of interest on the basis of the length of the line light image. With reference to FIG. 10, the following describes processing of determining, through the new region-of-interest generation determining unit 92, whether to generate the second region of interest on the basis of the length of the line light image. The control unit 30 acquires reference region-of-interest data from the position setting data 44 of the reference region of interest through the in-reference region-of-interest projection pattern image detecting unit 90 (step S40). After having acquired the reference region-of-interest data, the control unit 30 detects a line light image in a reference region of interest of the picture image data through the in-reference region-of-interest projection pattern image detecting unit 90 (step S62). After having detected the line light image, the control unit 30 detects the length of the line light image (step S64). The length of the line light image is the longitudinal length of the line light image. When sequentially detecting the picture image data from the upper side to the lower side or from the lower side to the upper side, the in-reference region-of-interest projection pattern image detecting unit 90 detects how long a pixel detected in each local maximum pixel search row continuously exists. If the line light image is disconnected in the direction orthogonal to the local maximum pixel search row and the line light image is not detected at a plurality of pixels, the in-reference region-of-interest projection pattern image detecting unit 90 may determine that the line light image is connected and detect the length thereof. In reality, an image of a line-shaped pattern acquired by the image sensor 20 is not necessarily continuous. A part of the image may lack due to, for example, a defect on the surface of the object to be measured in some cases. In such a case, exceptional processing may be provided assuming that the image is continuously connected when, for example, one, two, or several pixels are lacking.

After having detected the length of the line light image, the control unit 30 determines whether the length of the line light image is equal to or larger than a threshold through the new region-of-interest generation determining unit 92 (step S64). If it is determined that the length of the line light image is equal to or larger than the threshold (Yes at step S66), the control unit 30 determines to generate the second region of interest (step S68). If it is determined that the length of the line light image is smaller than the threshold (No at step S66), the control unit 30 determines not to generate the second region of interest (step S69).

In this manner, the second region-of-interest generating unit 88 of the control unit 30 can generate a new region of interest on the basis of the line light image in the reference region of interest by generating the second region of interest on the basis of the length of the line light image, and can set a region of interest in which a line light image included in the picture image data is extracted.

The description of the processing performed by the control unit 30 continues with reference to FIG. 8. If it is determined by the new region-of-interest generation determining unit 92 to generate the second region of interest (Yes at step S22), the control unit 30 determines the second region of interest on the basis of the reference region of interest through the second region-of-interest determining unit 94 (step S24). The second region of interest is determined on the basis of the reference region of interest in the present embodiment, but may be determined on the basis of the position of line light image included in the reference region of interest.

If it is determined by the new region-of-interest generation determining unit 92 not to generate the second region of interest (No at step S22) or if the second region of interest is determined at step S24, the control unit 30 performs region-of-interest cancellation determination processing through the region-of-interest cancellation determining unit 89 (step S26). Specifically, the region-of-interest cancellation determining unit 89 determines whether to cancel a set region of interest on the basis of the position or size of the region of interest. If the set region of interest is set out of a visual field of the screen data on the basis of a distance estimated to be traveled by a timing of the next image capturing at the image capturing apparatus 9 around a pattern existing in screen data, the region-of-interest cancellation determining unit 89 determines to cancel this region of interest. If the area of a region of interest set on the picture image data is smaller than a threshold area, the region-of-interest cancellation determining unit 89 determines to cancel this region of interest.

The region-of-interest cancelling determination is based on the area of a region of interest on the picture image data, but is not limited thereto. For example, range information such as an effective image capturing range may be set on the picture image data and the determination may be based on the area of an overlapping region between the effective image capturing range and the region of interest. In particular, since an image of a periphery region of the picture image data is likely to be affected by various aberrations due to an imaging optical system, an intensity distribution of an image of a pattern in a transverse direction is disturbed due to the influence of aberration. This affects measurement accuracy, and thus such a periphery region may be avoided, and the effective image capturing range may be set only in a central region of the picture image data.

If it is determined by the region-of-interest cancellation determining unit 89 that there is a region of interest to be canceled (Yes at step S28), the control unit 30 cancels this region of interest through the region-of-interest determining unit 86 (step S30).

If it is determined by the region-of-interest cancellation determining unit 89 that there is no region of interest to be canceled (No at step S28) or if the processing at step S30 is performed, the control unit 30 determines through the region-of-interest determining unit 86 and stores a generated region of interest in the region-of-interest data (step S32). The control unit 30 also stores, in the region-of-interest data 42, the region of interest in association with the relative positions of the optical probe 3 and the object to be measured acquired by the movement information acquiring unit 82.

More specific description will be made with reference to FIGS. 11 and 12. FIG. 12 illustrates an example in which the line light image moves upward in the picture image data. First, the shape measuring device 1 includes, as the position setting data 44 of the reference region of interest, data when a reference region of interest 402 is set for a frame 400 overlapping the entire picture image data illustrated in FIG. 11. The following describes a case in which no region of-interest is initially set in the shape measuring device 1.

When processing is started, the control unit 30 acquires picture image data $F_{(N-1)}$ as illustrated in step ST101. The control unit 30 superimposes the reference region of interest 402 on the acquired picture image data $F_{(N-1)}$ and detects a line light image included in the reference region of interest 402. At step ST101, no line light image is included in the reference region of interest 402, and thus no second region of interest is generated.

After having performed setting of a region of interest for picture image data $F_{(N-1)}$ at step ST101, the control unit 30 acquires picture image data $F_{(N)}$, which is the next frame, as illustrated in step ST102. Picture image data $F_{(N)}$ is a picture image acquired when the relative positions of the optical probe 3 and the object to be measured M are moved from relative positions captured in picture image data $F_{(N-1)}$ by a predetermined distance. The control unit 30 imposes the reference region of interest 402 on the acquired picture image data $F_{(N)}$ as illustrated in step ST101 and detects a line light image 410 included in the reference region of interest 402.

When having detected the line light image 410 included in the reference region of interest 402 and detected that the line light image 410 satisfies the conditions, the control unit 30 generates a region of interest (second region-of-interest) 412 by using, as a reference, the position of the line light image 410 as illustrated in step S103. Data of the generated region of interest 412 is stored in the region-of-interest data 42.

After having performed setting of a region of interest for picture image data $F_{(N)}$ at step ST103, the control unit 30 acquires picture image data $F_{(N+1)}$, which is the next frame, as illustrated in step ST104. As indicated in step ST104, the relative positions of the optical probe 3 and the object to be measured M have moved, and thus a line light image 410a included in picture image data $F_{(N+1)}$ is at a position closer to an edge of the region of interest 412 than the line light image 410. As indicated in step ST105, the control unit 30 detects the line light image 410a included in the reference region of interest 402, but the line light image 410a is a line light image as a target that can be detected in the region of interest 412, and thus no second region of interest is generated. As illustrated in step S106, the control unit 30 generates a region of interest 412a by using, as a reference, the position of the line light image 410a.

The control unit 30 performs the processing at steps ST104 to S106 at each acquisition of picture image data of the next frame. A line light image in picture image data moves toward an upper side of a screen as the frame proceeds. The control unit 30 performs the processing at steps ST104 to ST106 at each acquisition of picture image data of the next frame so as to move the position of a region of interest toward the upper side of the screen along with movement of line light image.

When having acquired picture image data $F_{(N+m)}$ at (m−1) frames later than picture image data $F_{(N+1)}$ at step ST106, the control unit 30 detects a line light image on the basis of information on a region of interest of the previous frame as illustrated in step ST107, and generates a region of interest 412b by using, as a reference, the detected line light image 410b. The control unit 30 detects in parallel a line light image included in the reference region of interest 402.

When having acquired picture image data $F_{(N+1-1)}$ later than picture image data $F_{(N+m)}$ at step ST107, the control unit 30 detects a line light image on the basis of information on a region of interest of the previous frame as illustrated in step S108, and generates a region of interest 412c by using, as a reference, the detected line light image 410c. In picture image data $F_{(N+1-1)}$, another line light 420 exists lower than the line light image 410c on the screen.

When having acquired picture image data $F_{(N+I)}$ of the next frame of picture image data $F_{(N+I-1)}$ at step ST108, the control unit 30 detects a line light image on the basis of information on a region of interest of the previous frame as illustrated in step ST109, and generates a region of interest 412d by using, as a reference, the detected line light image 410d. In picture image data $F_{(N+I)}$, another line light image 420a lower than the line light image 410c on the screen is included in the reference region of interest 402. When having detecting the line light image 420a included in the reference region of interest 402 and detected that the line light image 420a of line light satisfies the conditions, the control unit 30 generates a region of interest (second region of interest) 422 by using, as a reference, the position of the line light image 420a as illustrated in step ST110. As a result, in the case of picture image data $F_{(N+1)}$, two regions of interest of the regions of interest 412*d* and 422 are set in an image capturing area of the image sensor or picture image data acquired from the image sensor.

The shape measuring device 1 can set a region of interest to be a position including a line light image by setting a region of interest on the basis of the position of the line light image. Specifically, the shape measuring device 1 can set a region of interest that moves in accordance with movement of the position of line light image on picture image data. When the position of line light image at actual measurement is shifted, the shape measuring device 1 can include the line light image in a region of interest by setting the region of interest to be a region including a part separated by a set distance from the line light image by using the line light image as a reference.

The following describes exemplary processing operation performed by the shape measuring device 1 with reference to FIG. 13. The control unit 30 of the shape measuring device 1 displays the screen 100 illustrated in FIG. 6 and executes the processing illustrated in FIG. 13, for example, when the teaching mode is selected.

When the teaching mode is selected, the control unit 30 previously sets the measurement range, the light adjustment region, and the light adjustment region setting avowed range to be the entire range that can be captured by the image capturing apparatus 9. Next, picture image data is forwarded from the image capturing apparatus 9 to the control unit 30 and displayed on the window 102. When the picture image data is displayed on the window 102, it is determined whether the measurement range is set (step S112). If the measurement range is set to be a range smaller than the entire range that can be captured by the image capturing apparatus 9, in other words, a range smaller than the entire range of the acquired picture image data, the control unit 30 determines that a measurement range is set. The measurement range may be set by specifying the measurement range by enclosing part of the picture image data with an optional shape such as a circle, a rectangle, or an ellipse on the window 102. For example, the control unit 30 sets the measurement range to be a range specified by the user after the measurement range selecting point 124 is selected and the button 130 is operated. Alternatively, the control unit 30 may set the measurement range on the basis of information set in the condition table 46. Alternatively, the control unit 30 may extract an image of a pattern projected by an illumination light beam from a picture image acquired by the image capturing apparatus 9 and set the measurement range to be a range in which this image of a pattern is extracted.

If it is determined that a measurement range is set (Yes at step S112), the control unit 30 performs setting processing of the measurement range on the basis of the position coordinates of picture image data through the measurement range setting unit 36, and writes the range to the condition table 46 in the storage unit 31 (step S114). The control unit 30 sets the measurement range to be a range smaller than the range that can be captured by the image capturing apparatus 9. If setting to set the measurement range to be a region of interest is selected, the control unit 30 sets the measurement range to be a region of interest.

If it is determined that no measurement range is set (No at step S112) or if the setting processing of the measurement range is performed, the control unit 30 determines whether the light adjustment region is set through the input device 6 (step S116).

If it is determined that the light adjustment region is set (Yes at step S116), the control unit 30 performs setting processing of the light adjustment region through the light adjustment region setting unit 37 (step S118). If setting to set the light adjustment region to be a region of interest is selected, the control unit 30 sets the light adjustment region to be a region of interest.

If it is determined that no light adjustment region is set (No at step S116) or if the setting processing of the light adjustment region is performed, the control unit 30 determines whether to execute prescanning (step S120). The prescanning is processing that moves a position at which a pattern image is projected by relatively moving the optical probe 3 and the object to be measured on the basis of a set condition and displays, on the display device 5, a position at which a line light image is projected. Picture image data including an image of a line-shaped pattern acquired by the image capturing apparatus 9 at a predetermined frame rate while relatively moving the object to be measured is sequentially displayed. The display is preferably continued while the measurement ranges 150*a* and 150*b*, the light adjustment region setting allowed range 152, and the light adjustment region 154 are simultaneously superimposed on the picture image data. If it is determined to execute the prescanning (Yes at step S120), the control unit 30 executes the prescanning processing (step S122).

If it is determined not to execute the prescanning (No at step S120) or if the prescanning processing has been performed, the control unit 30 determines whether setting has ended (step S124). If it is determined that setting has not ended (No at step S124), the control unit 30 returns to step S112 and executes the above-described processing again.

After position information on the measurement range and position information on the light adjustment range stored in the storage unit 31, and a measurement condition such as a scanning path of the optical probe 3 are set, the control unit 30 generates a shape measuring program (step S128). The control unit 30 generates the shape measuring program for measuring the object to be measured Ma, including the measurement range, the light adjustment region, a light adjustment scheme, and a measurement coordinates calculation region, and stores the shape measuring program in the storage unit 31. Specifically, the control unit 30 determines a measurement path and a measurement speed on the basis of various conditions, and determines, for example, a path of movement in the X-axis, Y-axis, and Z-axis directions by the probe moving device 2, a rotational speed in the Zθ direction by the holding and rotating device 7, and a timing of picture image acquisition by the optical probe 3, and generates the shape measuring program including determined operation information, information on a set light adjustment condition, and information on a measurement range in which the position of an image of a pattern is extracted from an acquired picture image.

After having generated the shape measuring program, the control unit 30 determines whether to execute measurement (step S130), The measurement is processing that moves a position at which a pattern image is projected by relatively moving the optical probe 3 and the object to be measured Ma on the basis of a set condition, detects a position at which the pattern image is projected in the measurement region, and acquires a coordinate value (point group data) of each site of the object to be measured so as to measure a shape. If it is determined to execute the measurement (Yes at step S130), the control unit 30 causes the image capturing apparatus 9 to repeat image capturing at a predetermined frame rate. The light adjustment control unit 38 detects, from picture image data thus captured, the brightness value of a pixel as a local maximum value in each local maximum pixel search row included in the light adjustment range, acquires the maximum value (value of a brightest pixel) of the brightness value as a maximum pixel value, and outputs information on light adjustment control to the light source device 8 and the image capturing apparatus 9 (step S131). Next, the image capturing apparatus 9 captures a picture image of an image of a pattern projected onto the object to be measured Ma based on the light adjustment condition, and sends this picture image data to the measurement unit 39 of the control unit 30 (step S132). Next, the measurement unit 39 acquires the position of the image of the pattern from the picture image data on the basis of measurement range information, and calculates, from position information on the probe moving device 2 and position information on the image of the pattern, a three-dimensional coordinate value of the part of the object to be measured Ma onto which the pattern is projected (step S133).

The control unit 30 according to the present embodiment can extract a line light image at high accuracy by setting a region of interest and setting the region of interest as the measurement range. The measurement range can be set by using the line light image as a reference, and thus the bright line 144 can be prevented from being included in the measurement range. Accordingly, the line light image (image of a pattern) can be more reliably extracted.

The control unit 30 according to the present embodiment can reduce a risk of light other than line light being included in the light adjustment region, by setting a region of interest and setting the region of interest as the light adjustment region. Accordingly, a light adjustment condition that facilitates detection of line light can be set.

The control unit 30 according to the present embodiment can automatically extract a region of interest the position of which changes along with the position of line light image on the basis of picture image data as described above. Accordingly, the measurement range and the light adjustment region in which the positions move can be set without checking picture image data for each set of relative positions of the optical probe 3 and the object to be measured M to set the measurement range and the light adjustment region.

The control unit 30 according to the present embodiment can execute the prescanning processing, which allows the user to visually check change of picture images of the measurement range and the light adjustment region when the object to be measured M and the illumination light beam L relatively move. Accordingly, the measurement range and the light adjustment region can be more appropriately set.

The region-of-interest setting unit 32 according to the above-described embodiment sets a region of interest to be a set range surrounding a line light image by using the position of the line light image as a reference, but a method of setting a region of interest is not limited thereto.

Figure 14:
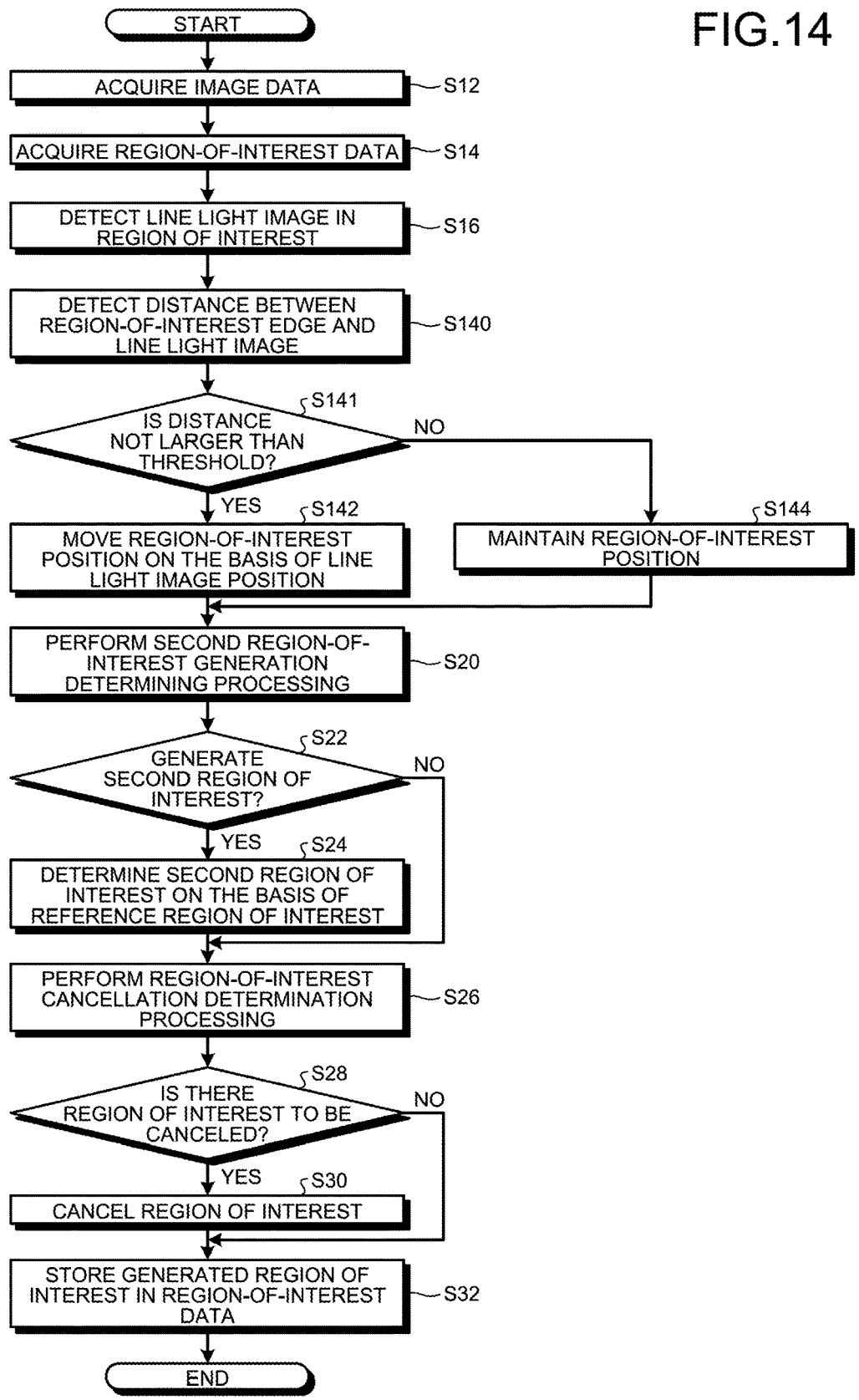
FIG. 14 is a flowchart of an exemplary region-of-interest setting operation performed by the shape measuring device according to the present embodiment.

FIG. 14 is a flowchart of exemplary region-of-interest setting operation performed by the shape measuring device according to the present embodiment. The region-of-interest setting operation illustrated in FIG. 14 is the same as the region-of-interest setting operation illustrated in FIG. 8 except for part of the processing. Any processing in the region-of-interest setting operation illustrated in FIG. 14, which is the same as the region-of-interest setting operation illustrated in FIG. 8 is denoted by an identical step, and detailed description thereof will be omitted. This setting operation is performed at each image capturing timing.

The control unit 30 acquires, through the picture image data acquiring unit 80, picture image data captured by the image capturing apparatus 9 (step S12). After having acquired the picture image data, the control unit 30 reads region-of-interest data stored in the region-of-interest data 42 through the projection pattern image detecting unit 84 (step S14). Next, the control unit 30 detects a line light image in a region of interest through the projection pattern image detecting unit 84 (step S16).

After having detected the position of the line light image, the control unit 30 detects a distance between an edge of the region of interest and the detected line light image through the region-of-interest determining unit 86 (step S140). The region-of-interest determining unit 86 detects the distance between the edge of the region of interest and the line light image. The distance between the edge of the region of interest and the line light image may be detected at a plurality of set representative points or at all positions. The distance between the edge of the region of interest and the line light image is a distance in a direction along a local maximum pixel search row.

After having detected the distance between the edge of the region of interest and the detected line light image, the control unit 30 determines whether the distance is not larger than a threshold through the region-of-interest determining unit 86 (step S141). If it is determined by the region-of-interest determining unit 86 that the distance is not larger than the threshold (Yes at step S141), in other words, if the line light image is close to the edge of the region of interest, the control unit 30 moves the position of the region of interest on the basis of the position of the line light image (step S142). The region-of-interest determining unit 86 moves the region of interest in a direction in which the line light image becomes closer to a central part of the region of interest.

After having performed the processing at step S142 or step S144, the control unit 30 determines the position of the region of interest, and then performs the second region-of-interest generation determining processing (step S20). The following processing is equivalent to that of the processing illustrated in FIG. 8.

As illustrated in FIG. 14, the shape measuring device 1 can simplify processing of setting the region of interest by maintaining the shape of the region of interest.

Figure 15:
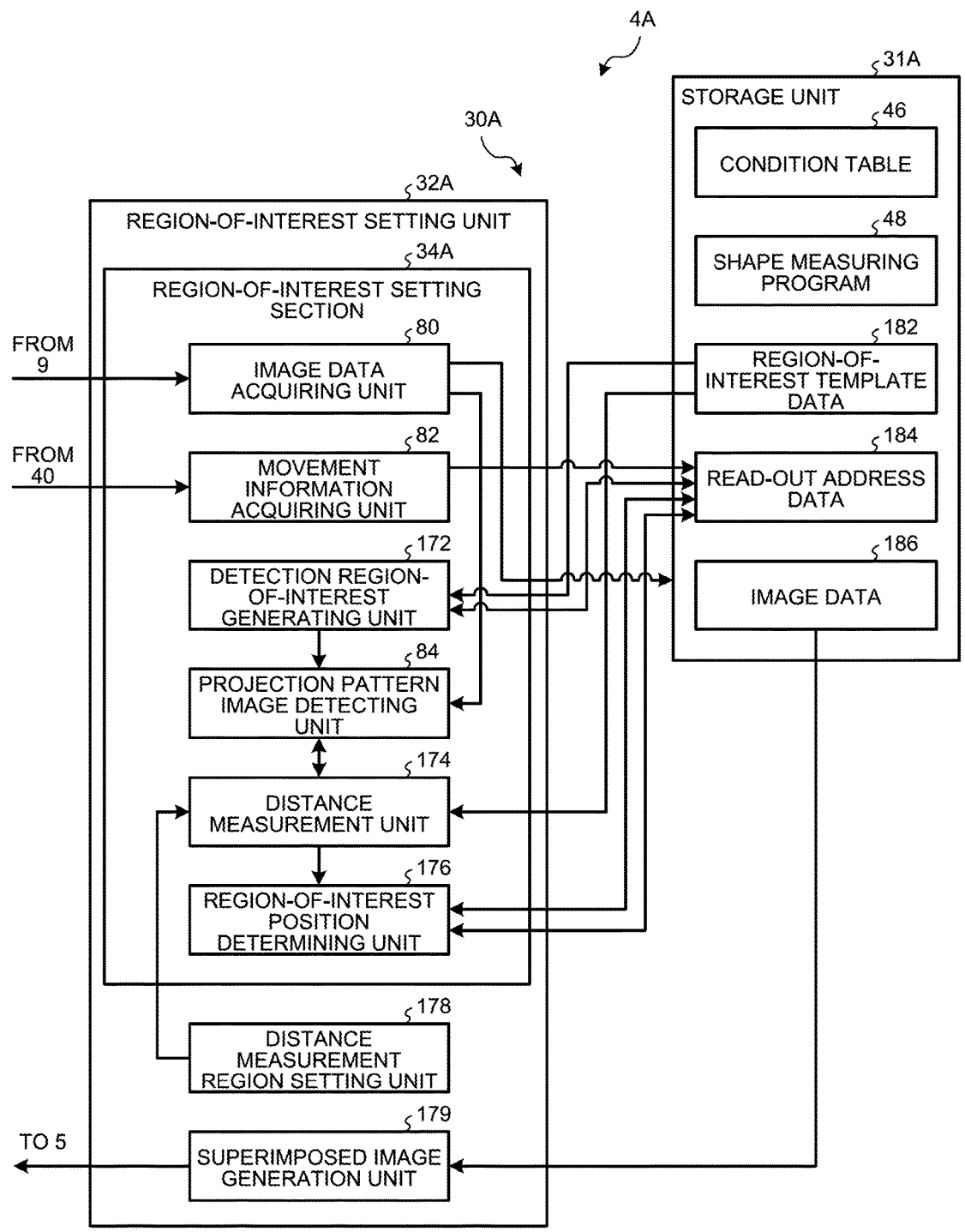
FIG. 15 is a block diagram of a schematic configuration of a region-of-interest setting unit and a storage unit of a control device.

FIG. 15 is a block diagram of schematic configurations of the region-of-interest setting unit and the storage unit of the control device. FIG. 15 illustrates a region-of-interest setting unit 32A and a storage unit 31A of a control unit 30A of a control device 4A.

The storage unit 31A will be first described. The storage unit 31A includes the condition table 46, the shape measuring program 48, region-of-interest template data 182, read-out address data 184, and picture image data 186. The storage unit 31 stores therein various kinds of computer programs and data used for operation control of the shape measuring device 1 in addition to these computer programs and data.

The region-of-interest template data 182 can be specified by the user in advance, and is a set region corresponding to a visual field that can be captured by the image capturing apparatus 9. This region-of-interest template data can be moved along a position superimposed on the visual field that can be captured by the image capturing apparatus 9.

The read-out address data 184 stores therein information on a position at which the region-of-interest template data 182 is superimposed on the picture image data, in association with the relation between the relative positions of the optical probe 3 and the object to be measured M.

The picture image data 186 stores therein the picture image data captured by the image capturing apparatus 9 and acquired by the picture image data acquiring unit 80.

The region-of-interest setting unit 32A includes a region-of-interest setting unit 34A, a distance measurement region setting unit 178, and a superimposed picture image generation unit 179. The region-of-interest setting unit 34A includes the picture image data acquiring unit 80, the movement information acquiring unit 82, the projection pattern image detecting unit 84, a detection region-of-interest generating unit 172, a distance measurement unit 174, and a region-of-interest position determining unit 176.

The detection region-of-interest generating unit 172 generates a detection region of interest used for setting of a region of interest on the basis of the region-of-interest template data 182 and the read-out address data 184. The detection region of interest is information on a region of interest set on the basis of picture image data acquired right before moving the relative positions of the optical probe 3 and the object to be measured M, in which a region of interest is to be set.

The distance measurement unit 174 measures a distance between the detection region of interest and a line light image included in the detection region of interest. The distance between the detection region of interest and the line light image may be detected at a plurality of set representative points or at all positions. A distance between an edge of the detection region of interest and the line light image is a distance in a direction along a local maximum pixel search row. A distance between an edge of the region of interest and the line light image in the direction along the local maximum pixel search row may be a distance averaged over a plurality of representative points or may be an average of measurement over the entire range of the region of interest in a direction substantially orthogonal to the local maximum pixel search row.

The region-of-interest position determining unit 176 determines a position at which the region-of-interest template data is to be disposed in the picture image data. The region-of-interest position determining unit 176 stores, in the read-out address data 184, information on the determined position in association with the relative positions of the optical probe 3 and the object to be measured M.

The distance measurement region setting unit 178 sets a position at which the distance between the detection region of interest and the line light image is to be measured.

The superimposed picture image generation unit 179 generates a picture image in which picture images of the line light image extracted in a plurality of pieces of picture image data acquired while relatively moving the optical probe 3 and the object to be measured M are superimposed. The superimposed picture image generation unit 179 extracts a picture image of the line light image by extracting only a picture image of the region of interest from the picture image data on the basis of information on the region of interest.

Figure 16:
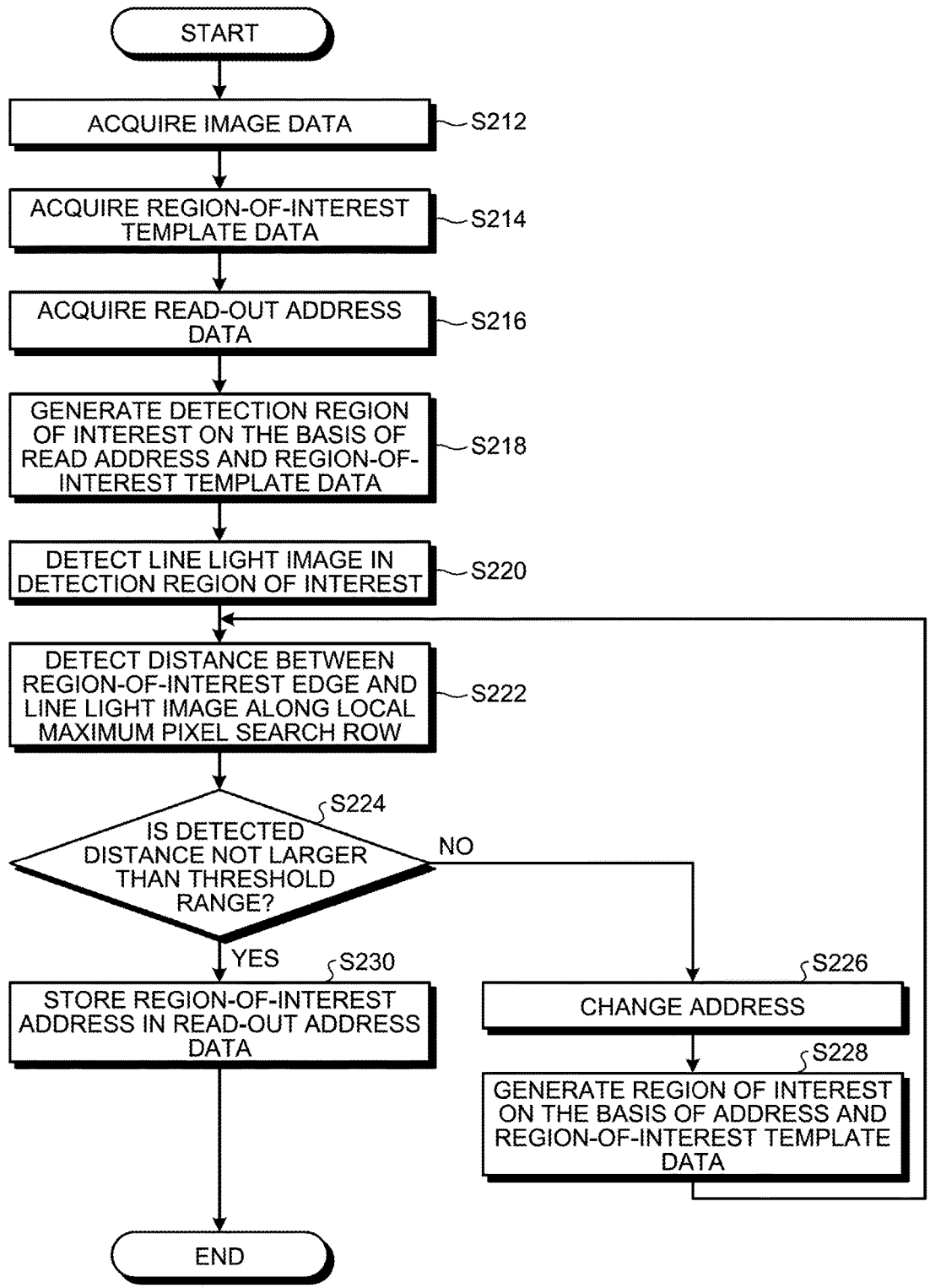
FIG. 16 is a flowchart of an exemplary region-of-interest setting operation performed by the shape measuring device according to the present embodiment.
Figure 17:
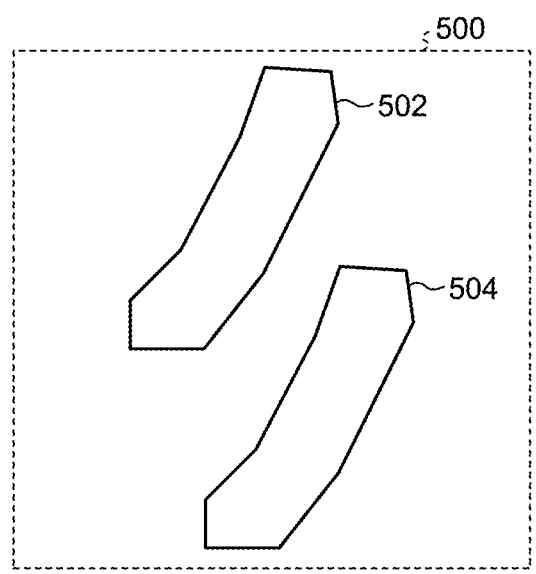
FIG. 17 is an explanatory diagram illustrating exemplary region-of-interest template data.
Figure 18:
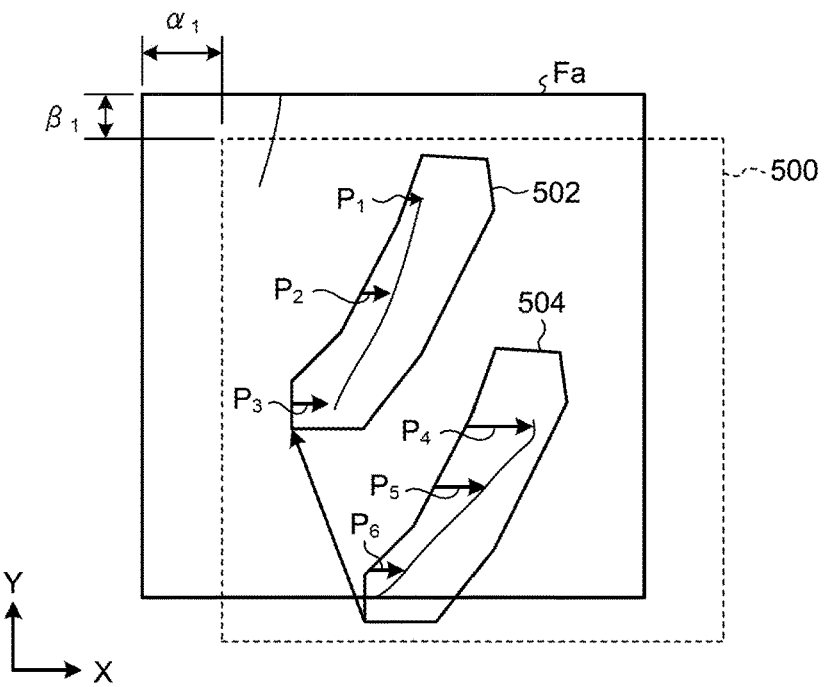
FIG. 18 is an explanatory diagram for explaining an exemplary region-of-interest setting operation.
Figure 19:
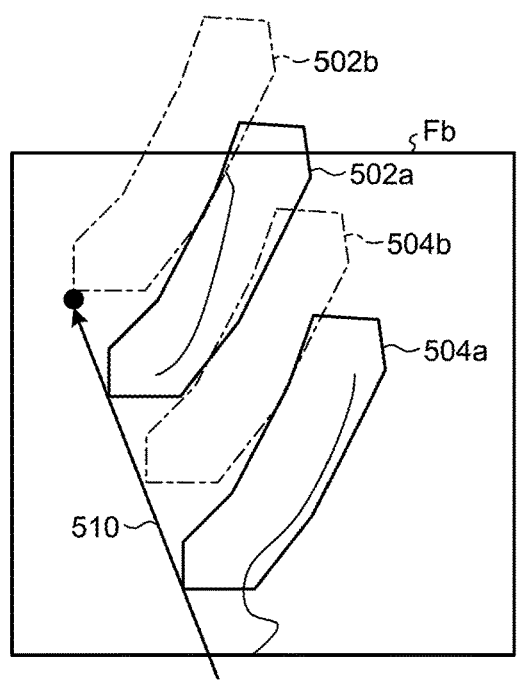
FIG. 19 is an explanatory diagram for explaining an exemplary region-of-interest setting operation.

FIG. 16 is a flowchart of exemplary region-of-interest setting operation performed by the shape measuring device according to the present embodiment. FIG. 17 is an explanatory diagram illustrating exemplary region-of-interest template data. FIGS. 18 and 19 are each an explanatory diagram for explaining exemplary region-of-interest setting operation. The processing illustrated in FIG. 16 is executed and achieved by the region-of-interest setting unit 32A of the control unit 30A. The control unit 30A sets a region of interest at each position at which the shape of the object to be measured N is measured, by executing the processing illustrated in FIG. 16 for each position at which a pattern image is projected while relatively moving the optical probe 3 and the object to be measured.

The control unit 30A acquires, through the picture image data acquiring unit 80, picture image data captured by the image capturing apparatus 9 (step S212). After having acquired the picture image data, the control unit 30A acquires the region-of-interest template data 182 through the detection region-of-interest generating unit 172 (step S214), acquires the read-out address data 184 (step S216), and generates the detection region of interest on the basis of the read address and the region-of-interest template data (step S218). The detection region of interest is a region of interest in which the position is specified where the picture image data are being superimposed.

The shape measuring device 1 includes a region-of-interest template 500 illustrated in FIG. 17 as the region-of-interest template data 182. The region-of-interest template 500 is data indicating the positions of two regions of interest 502 and 504. The region-of-interest template data 182 stores the region-of-interest template 500 as, for example, a look-up table.

The control unit 30A determines the position where the region-of-interest template 500 is superimposed on picture image data Fa on the bases of address information. When address information on shifting by $\alpha_1$ in an $\alpha$ direction illustrated in FIG. 18 and by $\beta_1$ in a $\beta$ direction illustrated in FIG. 18 is set, the control unit 30 generates a detection region of interest including the regions of interest 502 and 504 where the region-of-interest template 500 is superimposed on a position shifted relative to the picture image data Fa by the distance of $\alpha_1$ in the $\alpha$ direction and by the distance of $\beta_1$ in the $\beta$ direction.

After having generated the detection region of interest, the control unit 30A detects a line light image in the detection region of interest through the projection pattern image detecting unit 84 (step S220). After having detected the position of the line light image, the control unit 30A detects a distance between an edge of a region of interest and the line light image in a direction along a local maximum pixel search row (step S222). The region of interest is a region of interest obtained by changing the position of the detection region of interest or the position of the detection region of interest.

As illustrated in FIG. 18, the control unit 30A detects a distance from the line light image in the direction along the local maximum pixel search row for each of six points of points $P_1$, $P_2$, and $P_3$ in the regions of interest 502, and points $P_4$, $P_5$, and $P_6$ in the regions of interest 504. A distance between an edge of the region of interest and the line light image in the direction along the local maximum pixel search row may be a distance averaged over a plurality of representative points, or may be an average of measurement over the entire range of the region of interest in a direction substantially orthogonal to the local maximum pixel search row.

After having detected the distance, the control unit 30A determines whether the distance detected by the region-of-interest position determining unit 176 is not larger than a threshold range (step S224). If it is determined that the distance is larger than the threshold (No at step S224), the control unit 30A changes the address of the region of interest through the region-of-interest position determining unit 176 (step S226), generates, on the basis of the address and the region-of-interest template data, a region of interest the position of which in the picture image data is changed (step S228), and returns to step S222.

If it is determined that the distance is not larger than the threshold (Yes at step S224), the control unit 30A stores the address of the region of interest in the read-out address data 184 through the region-of-interest position determining unit 176 (step S230). The control unit 30A stores, in the read-out address data 184, the address of the region of interest in association with the relative positions of the optical probe 3 and the object to be measured acquired by the movement information acquiring unit 82.

The control unit 30A can move the region of interest along arrow 510 indicating the moving direction of the line light image as illustrated in FIG. 19 by setting an address position to picture image data acquired while the relative positions move, in other words, picture image data of each frame. The control unit 30A preferably sets an address to switch a correspondence relation between a region of interest and the line light image at a predetermined timing such that the line light image detected in the regions of interest 504 is detected in the regions of interest 502. Accordingly, the line light image can be efficiency detected in a plurality of regions of interest.

The control unit 30A can preferably set a relation between the relative movement of the optical probe 3 and the object to be measured M and the moving direction of the line light image on picture image data. This can facilitate detection of the line light image on the basis of a region of interest.

Figure 20:
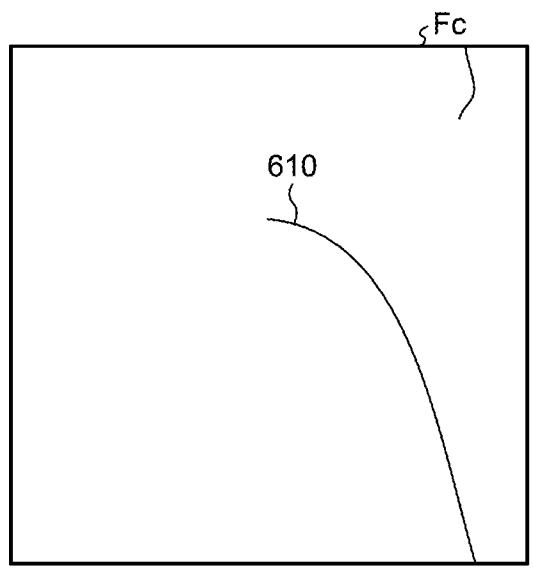
FIG. 20 is an explanatory diagram for explaining an exemplary region-of-interest setting operation.
Figure 21:
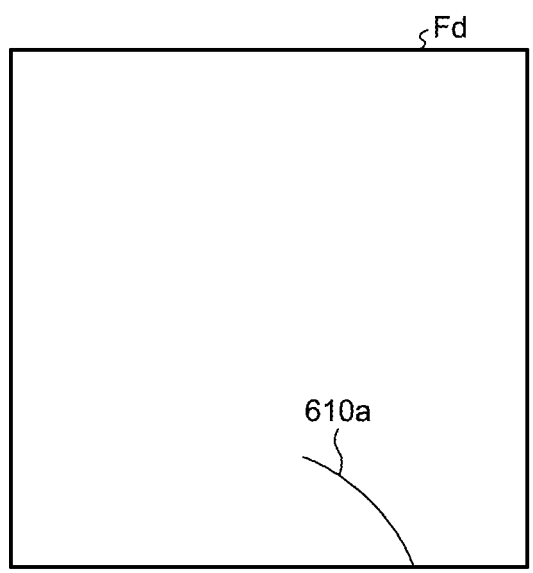
FIG. 21 is an explanatory diagram for explaining an exemplary region-of-interest setting operation.
Figure 22:
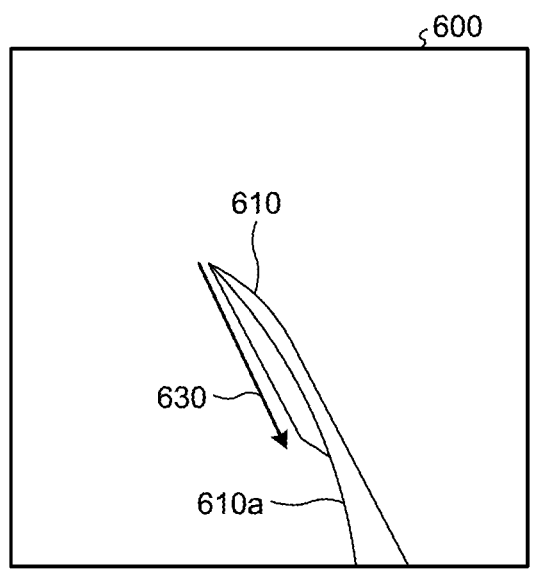
FIG. 22 is an explanatory diagram for explaining an exemplary region-of-interest setting operation.

FIGS. 20 to 22 are each an explanatory diagram for explaining exemplary region-of-interest setting operation. The control unit 30A preferably displays a screen for setting a moving direction together with a picture image captured by the image capturing apparatus 9. For example, the control unit 30A preferably displays picture image data Fe including a line light image 610 illustrated in FIG. 20 and picture image data Fd including a line light image 610a illustrated in FIG. 21. The picture image data Fc is picture image data of a frame at measurement start. The picture image data Fe is picture image data of a frame at measurement end. The control unit 30A preferably displays both of the picture image data Fe and the picture image data Fd.

The control unit 30A preferably displays the screen for setting a moving direction together with a picture image generated by the superimposed picture image generation unit 179. For example, as illustrated in FIG. 22, the control unit 30A adds a line light image of a frame between the picture image data Fe and the picture image data Fd, and displays picture image data 600 on which line light images are superimposed on. The picture image data 600 includes both of the line light image 610 of the picture image data Fc and the line light image 610a of the picture image data Fd. The control unit 30A can display a picture image that allows easy recognition of a direction indicated by arrow 630 by displaying the picture image generated by the superimposed picture image generation unit 179.

As in the above-described embodiment, the shape measuring device 1 preferably detects the position of line light image on the basis of picture image data including a line light image acquired by the image capturing apparatus 9 and sets a region of interest on the basis of the position of the line light image, but is not limited thereto. The shape measuring device 1 may set a region of interest without using picture image data. The shape measuring device 1 may set a region of interest on the basis of position information when line light is projected onto the object to be measured. For example, the shape measuring device 1 may perform simulation on the basis of the specification data 49 and various conditions of the device, estimate the position of line light image, and set a region of interest on the basis of the estimated position of the line light image.

The shape measuring device 1 may detect the moving direction of line light image and move the position of a region of interest on screen data on the basis of the moving direction. A moving amount may be constant or may vary according to a set rule. The shape measuring device 1 may detect the moving direction on the basis of the relative movement of the optical probe 3 and the object to be measured 14 and move a region of interest accordingly.

Although the above describes the example in which a line-shaped pattern is projected by the illumination optical system 13 of the optical probe 3, the present invention is not limited thereto. For example, an optical system that projects a dotted spot pattern onto the object to be measured M, and an illumination optical system provided with a deflection scanning mirror to allow scanning of the spot pattern on the surface of the object to be measured M in one direction may be used. In this case, the longitudinal direction of the line-shaped pattern corresponds to a scanning direction of the deflection scanning mirror. This allows projection while performing scanning at least in a line-shaped scanning range of the dotted spot pattern, and the line-shaped scanning range forms a line-shaped pattern.

Figure 23:
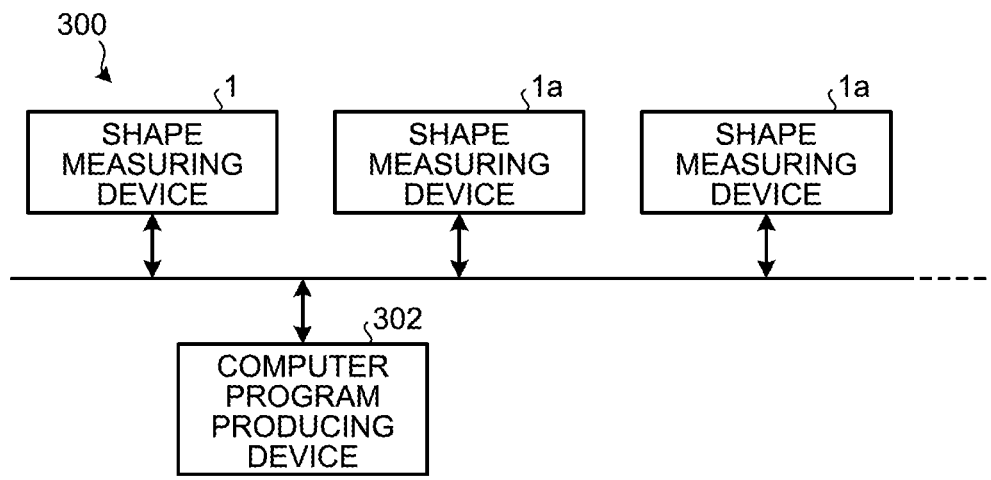
FIG. 23 is a pattern diagram illustrating the configuration of a system including the shape measuring device.

The shape measuring device 1 according to the above-described embodiment performs processing by one device, but may use a plurality of combined devices. FIG. 23 is a pattern diagram illustrating the configuration of a system including a shape measuring device. The following describes a shape measuring system 300 including a shape measuring device with reference to FIG. 23. The shape measuring system 300 includes the shape measuring device 1, a plurality (in FIG. 23, two) of shape measuring devices 1a, and a computer program producing device 302. The shape measuring devices 1 and 1a and the computer program producing device 302 are connected with each other through a wired or wireless communication line. Each shape measuring device 1a has a configuration same as that of the shape measuring device 1 without the region-of-interest setting unit 32. The computer program producing device 302 produces various kinds of settings and computer programs produced by the control device 4 of the shape measuring device 1 described above. Specifically, the computer program producing device 302 produces, for example, information on the measurement range, the light adjustment region setting allowed range, and the light adjustment region, and a shape measuring program including the information on the measurement range, the light adjustment region setting allowed range, and the light adjustment region. The computer program producing device 302 outputs produced computer program and data to the shape measuring devices 1 and 1a. The shape measuring device 1a acquires information on a region and a range and the shape measuring program from the shape measuring device 1 or the computer program producing device 302, and performs processing by using the acquired data and computer program. The shape measuring system 300 can effectively use the produced data and computer program by executing a measurement program through the shape measuring device 1 and measurement through the shape measuring device 1a using data and computer programs produced by the computer program producing device 302. The shape measuring device 1a can perform measurement without the region-of-interest setting unit 32 or any component that performs other setting.

Figure 24:
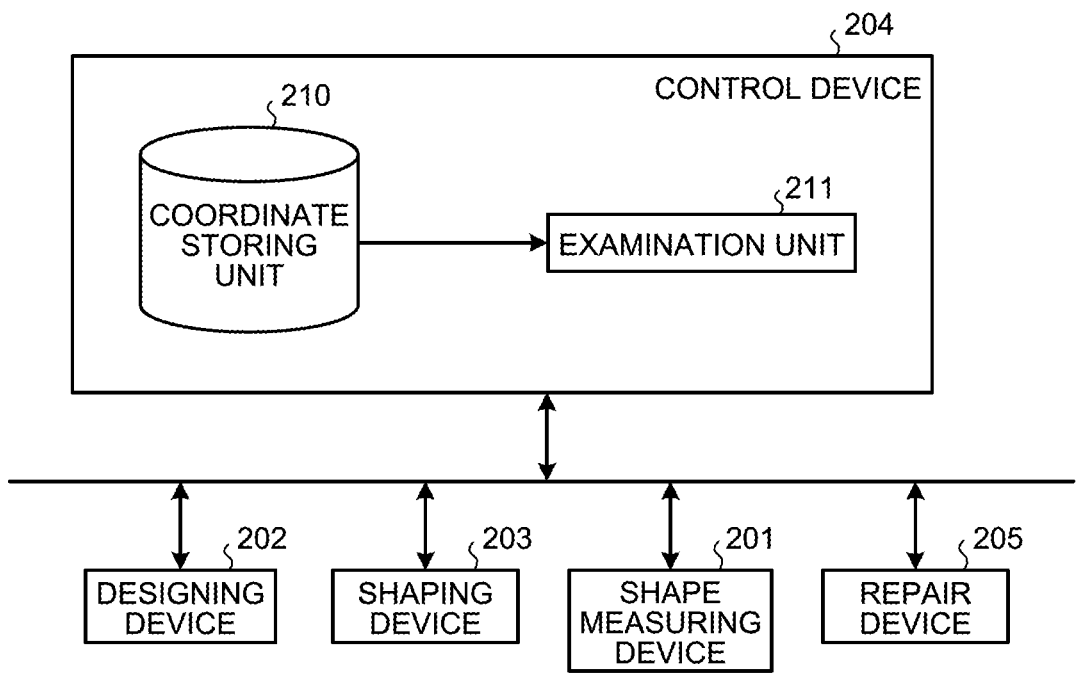
FIG. 24 is a diagram illustrating the configuration of a structured object manufacturing system according to the present embodiment.

The following describes a structured object manufacturing system including the shape measuring device described above with reference to FIG. 24. FIG. 24 is a block configuration diagram of the structured object manufacturing system. This structured object manufacturing system 200 according to the present embodiment includes a shape measuring device 201 as described in the above-described embodiment, a designing device 202, a shaping device 203, a control device (examination device) 204, and a repair device 205. The control device 204 includes a coordinate storing unit 210 and an examination unit 211.

The designing device 202 produces designing information related to the shape of a structured object, and transmits the produced designing information to the shaping device 203. The designing device 202 stores the produced designing information in the coordinate storing unit 210 of the control device 204. The designing information includes information indicating the coordinates of each position of the structured object.

The shaping device 203 produces the above-described structured object on the basis of the designing information input from the designing device 202. The shaping of the shaping device 203 includes, for example, molding, forging, and machining. The shape measuring device 201 measures the coordinates of the produced structured object (object to be measured) and transmits information (shape information) indicating the measured coordinates to the control device 204.

The coordinate storing unit 210 of the control device 204 stores therein the designing information. The examination unit 211 of the control device 204 reads the designing information from the coordinate storing unit 210. The examination unit 211 compares the information (shape information) indicating coordinates received from the shape measuring device 201 and the designing information read from the coordinate storing unit 210. The examination unit 211 determines whether the structured object is shaped according to the designing information on the basis of a result of the comparison. In other words, the examination unit 211 determines whether the produced structured object is a non-defective product. If the structured object is not shaped according to the designing information, the examination unit 211 determines whether the structured object can be repaired. If the structured object can be repaired, the examination unit 211 calculates a defect part and a repair amount on the basis of the result of the comparison, and transmits information indicating the defect part and information indicating the repair amount to the repair device 205.

The repair device 205 processes the defect part of the structured object on the basis of the information indicating the defect part and the information indicating the repair amount, which are received from the control device 204.

Figure 25:
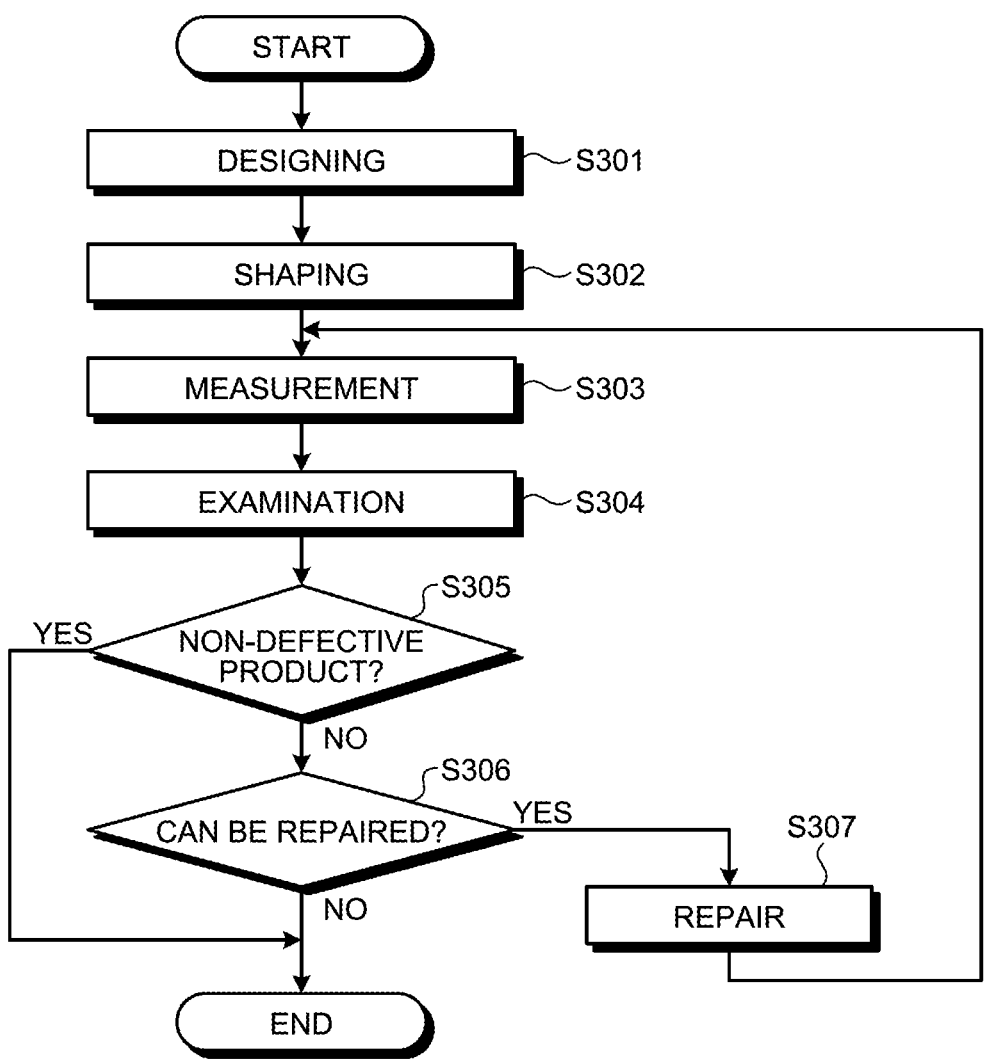
FIG. 25 is a flowchart of a structured object manufacturing method according to the present embodiment.

FIG. 25 is a flowchart indicating the process of processing performed by the structured object manufacturing system. In the structured object manufacturing system 200, first, the designing device 202 produces designing information related to the shape of the structured object (step S301). Next, the shaping device 203 produces the above-described structured object on the basis of the designing information (step S302). Next, the shape measuring device 201 measures the shape of the produced above-described structured object (step S303). Next, the examination unit 211 of the control device 204 examines whether the structured object is produced according to the designing information by comparing shape information obtained by the shape measuring device 201 and the above-described designing information (step S304).

Next, the examination unit 211 of the control device 204 determines whether the produced structured object is a non-defective product (step S305). If the examination unit 211 determines that the produced structured object is a non-defective product (Yes at step S305), the structured object manufacturing system 200 ends the process. If it is determined that the produced structured object is not a non-defective product (No at step S305), the examination unit 211 determines whether the produced structured object can be repaired (step S306).

If the examination unit 211 determines that the produced structured object can be repaired (Yes at step S306), the repair device 205 in the structured object manufacturing system 200 performs reprocessing of the structured object (step S307), and the process returns to the processing at step S303. If the examination unit 211 determines that the produced structured object cannot be repaired (No at step S306), the structured object manufacturing system 200 ends the process. Accordingly, the structured object manufacturing system 200 ends the processing of the flowchart illustrated in FIG. 25.

The shape measuring device 201 in the above-described embodiment can highly accurately measure the coordinates of the structured object, and thus the structured object manufacturing system 200 according to the present embodiment can determine whether the produced structured object is a non-defective product. The structured object manufacturing system 200 can perform reprocessing of the structured object to repair the structured object if the structured object is not a non-defective product.

A repair process executed by the repair device 205 in the present embodiment may be replaced with a process in which the shaping device 203 executes shaping process again. In this case, if the examination unit 211 of the control device 204 determines that repair is possible, the shaping device 203 executes the shaping process (for example, forging and machining) again. Specifically, for example, the shaping device 203 performs machining of any part of the structured object that needs to be machined but is not machined yet. In this manner, the structured object manufacturing system 200 can accurately produce the structured object.

The preferable embodiments of the present invention are described above with reference to the accompanying drawings, but the present invention is not limited thereto. Various shapes, combinations, and the like of components indicated in the examples described above are merely exemplary, and may be changed in many ways on the basis of, for example, a designing request without departing from the gist of the present invention.

For example, the above-described embodiment exemplarily describes the shape measuring device 1 in which the holding member 55 holds the optical probe 3 at one position, but is not limited thereto, and the holding may be performed at two positions. The holding at two positions can reduce any deformation that occurs to the holding member 55 at rotation, thereby achieving improved measurement accuracy.

In the above-described embodiment, line light is projected as the illumination light beam L from the optical probe 3, and a line-shaped pattern reflected by the object to be measured is captured, but the optical probe 3 is not limited to this scheme. Illumination light emitted from the optical probe 3 may be projected in a predetermined plane at once. For example, a scheme disclosed in U.S. Pat. No. 6,075,605 is applicable. The illumination light emitted from the optical probe may be projected as a point spot light.

The shape measuring device can be suitably used for measurement of an object to be measured having a shape including a repeated shape in the circumferential direction and an uneven shape extending in a direction different from the circumferential direction as in the above-described embodiment. The shape measuring device can set the measurement range, the light adjustment region setting allowed range, and the light adjustment region for one repeated shape and use the set conditions in measurement of another repeated shape. The object to be measured is not limited to a shape including a repeated shape in the circumferential direction and an uneven shape extending in a direction different from the circumferential direction, but may have various kinds of shapes such as a shape not including a repeated shape.

REFERENCE SIGNS LIST 1 shape measuring device
2 probe moving device
3 optical probe
4 control device
5 display device
6 input device
7 holding and rotating device
8 light source device
9 image capturing apparatus
10 drive unit
11 position detecting unit
12 light source
13 illumination optical system
20 image sensor
20a light-receiving surface
21 imaging optical system
21a object plane
30 control unit
31 storage unit
32, 32A region-of-interest setting unit
34 region-of-interest setting unit
36 measurement range setting unit
37 light adjustment region setting unit
38 light adjustment control unit
39 measurement unit
40 operation control unit
42 position setting data of region of interest
44 position setting data of reference region of interest
46 condition table
48 shape measuring program
49 specification data
50X, 50Y, 50Z movement unit
51X, 51Y, 51Z guide unit
52 holding member
53 first rotation unit
53a rotational axis line
54 second rotation unit
55 holding member
55A first holding unit
55B second holding unit
62, 63, 64, 65, 66, 68 arrow
71 table
72 rotation unit
73a, 73b reference ball
80 picture image data acquiring unit
82 movement information acquiring unit
84 projection pattern image detecting unit
86 region-of-interest determining unit
88 second region-of-interest generating unit
89 region-of-interest cancellation determining unit
90 in-reference region-of-interest projection pattern image detecting unit
92 new region-of-interest generation determining unit
94 second region-of-interest determining unit
100 screen
102, 102a, 102b, 102c picture image window
104, 106 window
112 measurement condition column
114, 128, 130 button
120 check box
122 light adjustment region selecting point
124 measurement range selecting point (point group extract range)
126 range column
140 object to be measured
142a, 142b, 142c line light
144 bright line
150a, 150b measurement region
152 light adjustment region setting allowed range
154 light adjustment region
172 detection region-of-interest generating unit
174 distance measurement unit
176 region-of-interest position determining unit
178 distance measurement region setting unit
179 superimposed picture image generation unit
182 region-of-interest template data
184 read-out address data
186 picture image data
200 structured object manufacturing system
201 shape measuring device
202 designing device
203 shaping device
204 control device
205 repair device
210 coordinate storing unit
211 examination unit
300 shape measuring system
302 computer program producing device
AX rotational axis center
B base
M object to be measured
L illumination light beam

The invention claimed is:

1. A shape measuring device comprising:
a projection unit configured to project a pattern onto a measurement target;
an image capturing unit configured to capture a picture image of a measurement target onto which the pattern is projected by the projection unit;
a movement unit capable of moving a projected position of the pattern on the measurement target by relatively moving the projection unit and the measurement target;
a region-of-interest setting unit configured to set a region of interest for acquiring information used to measure the measurement target, as at least part of a region captured by the image capturing unit to include an image of the pattern; and
a reference region-of-interest setting unit configured to set a reference region-of-interest in part of the region captured by the image capturing unit, wherein
the region-of-interest setting unit determines whether to set the region of interest based on a state of the image of the pattern in the reference region-of-interest, and sets the region of interest in a case where the image of the pattern is in the reference region-of-interest.

2. The shape measuring device according to claim 1, wherein the region-of-interest setting unit sets the region of interest based on a picture image including an image of the pattern acquired by the image capturing unit.

3. The shape measuring device according to claim 1, wherein the region-of-interest setting unit sets the region of interest based on position information when the pattern is projected onto the measurement target.

4. The shape measuring device according to claim 1, wherein the region-of-interest setting unit sets the region of interest based on movement information including a condition of relative movement between the projection unit and the measurement target.

5. The shape measuring device according to claim 4, wherein
the movement information includes a moving direction of a position at which the pattern is projected onto the measurement target, and
the region-of-interest setting unit sets the region of interest based on the moving direction.

6. The shape measuring device according to claim 4, wherein the region-of-interest setting unit sets the region of interest based on an image of the pattern before the relative movement is performed, and a moving distance of the image of the pattern on an imaging plane of the image capturing unit calculated based on the relative movement condition.

7. The shape measuring device according to claim 4, wherein the region-of-interest setting unit sets again the region of interest based on a moving distance or moving direction of an image of the pattern caused by relative movement of a projected position of the pattern.

8. The shape measuring device according to claim 7, wherein the region-of-interest setting unit calculates the moving distance or moving direction of the image of the pattern based on a plurality of picture images before and after the relative movement.

9. The shape measuring device according to claim 7, wherein the region-of-interest setting unit moves the region of interest based on a distance from an outer edge of the region of interest to the image of the pattern.

10. The shape measuring device according to claim 9, further comprising a distance measurement region setting unit configured to set a distance measurement region that specifies a place in which the distance from the outer edge of the region of interest to the image of the pattern is measured.

11. The shape measuring device according to claim 7, further comprising a superimposed picture image generation unit configured to generate a picture image in which the images of the pattern of a plurality of pieces of picture image data acquired by performing image capturing during the relative movement are superimposed with each other, wherein
the region-of-interest setting unit calculates the moving distance or moving direction of the image of the pattern based on the picture image in which the images of a pattern are superimposed and that is generated by the superimposed picture image generation unit.

12. The shape measuring device according to claim 7, wherein the region-of-interest setting unit calculates the moving distance or moving direction of the image of the pattern based on a relative moving direction of the projection unit relative to the measurement target obtained from the movement unit and specification data of the measurement target.

13. The shape measuring device according to claim 1, wherein the region-of-interest setting unit sets the region of interest based on the reference region of interest and the movement information.

14. The shape measuring device according to claim 1, wherein the region-of-interest setting unit includes a second region-of-interest generating unit configured to newly generate a second region of interest at a position at which the reference region of interest is set.

15. The shape measuring device according to claim 14, wherein the second region-of-interest generating unit includes a new region-of-interest generation determining unit configured to determine whether to newly generate the second region of interest based on a feature amount of an image formed inside the reference region of interest.

16. The shape measuring device according to claim 15, wherein
the projection unit projects line light by projecting a light beam having a line-shaped light intensity distribution as a pattern projected onto the measurement target, and
the new region-of-interest generation determining unit detects, for an image of the pattern of line light in the reference region of interest, a pixel having a peak value detected along a detection direction of the image of the pattern of line light, at each position in a direction intersecting the detection direction of the image of the pattern of line light, and performs control to newly generate the region of interest when the number of peak pixels is equal to or larger than a set value.

17. The shape measuring device according to claim 15, wherein the new region-of-interest generation determining unit performs control to newly generate the region of interest when the image of the pattern of line light in the reference region of interest has a length that is equal to or larger than a set length.

18. The shape measuring device according to claim 14, wherein the region-of-interest setting unit includes a region-of-interest cancellation determining unit configured to determine whether to cancel the second region of interest based on a feature of an image formed inside the second region of interest.

19. The shape measuring device according to claim 1, further comprising a probe provided with a housing holding the projection unit and the image capturing unit so that a projection direction of the line light by the projection unit and an image capturing direction of the image capturing unit are different from each other.

20. The shape measuring device according to claim 1, wherein
the region of interest is a point group generation region,
the shape measuring device further comprising a measurement unit configured to measure a shape of the measurement target based on a position of the image of the pattern positioned in the point group generation region of the picture image data.

21. The shape measuring device according to claim 1, wherein
the region of interest is a light adjustment region,
the shape measuring device further comprising a light adjustment control unit configured to control, in accordance with brightness of an image detected and captured in the light adjustment region of the picture image data, the amount of projected light from the projection unit, the quantity of light received by the image capturing unit, an exposure when the picture image data is acquired by the image capturing unit, or an input and output feature of the image capturing unit.

22. The shape measuring device according to claim 1, the region-of-interest setting unit configured to change the region of interest based on movement of a projected position of the pattern on the measurement target.

23. A structured object manufacturing system comprising:
a shaping device configured to shape a structured object based on designing information related to the shape of the structured object;
the shape measuring device according to claim 1 configured to measure the shape of the structured object shaped by the shaping device; and
a control device configured to compare the designing information and shape information indicating the shape of the structured object measured by the shape measuring device.

24. A shape measuring method that projects a pattern onto a measurement target, acquires picture image data by capturing a picture image of an image of the pattern projected onto the measurement target in a direction different from a projection direction of the pattern, and measures the shape of the measurement target based on the image of the pattern of the picture image data, the shape measuring method comprising:
moving a projected position of the pattern relative to the measurement target;
setting a region of interest for acquiring information used to measure the measurement target to be in at least part of a region captured by the image capturing unit, so as to include the image of the pattern;
measuring a shape of the measurement target based on a position of the image of the pattern positioned in the region of interest of the picture image data; and
setting a reference region-of-interest in part of the region captured by the image capturing unit, wherein
determining whether to set the region of interest based on a state of the image of the pattern in the reference region-of-interest, and setting the region of interest in a case where the image of the pattern is in the reference region-of-interest.

25. A structured object manufacturing method comprising:
shaping a structured object based on designing information related to the shape of the structured object;
measuring the shape of the shaped structured object by the shape measuring method according to claim 24; and
comparing the designing information and shape information indicating the measured shape of the structured object.

26. A non-transitory computer readable recording medium storing a shape measuring program that projects a pattern onto a measurement target, acquires picture image data by capturing a picture image of an image of the pattern projected onto the measurement target in a direction different from a projection direction of the pattern, and measures the shape of the measurement target based on the image of the pattern of the picture image data, the shape measuring program being configured to cause a computer to execute:
moving a projected position of the pattern relative to the measurement target;
setting a region of interest for acquiring information used to measure the measurement target to be in at least part of a region captured by the image capturing unit, so as to include the image of the pattern;
measuring a shape of the measurement target based on a position of the image of the pattern positioned in the region of interest of the picture image data; and
setting a reference region-of-interest in part of the region captured by the image capturing unit, wherein
determining whether to set the region of interest based on a state of the image of the pattern in the reference region-of-interest, and setting the region of interest in a case where the image of the pattern is in the reference region-of-interest.

27. A shape measuring device comprising:
a projection unit configured to project a pattern of light onto a measurement target;
an image capturing unit configured to capture a picture image of a measurement target onto which the pattern of light is projected by the projection unit;
a movement unit capable of moving a projected position of the pattern of light on the measurement target by relatively moving the projection unit and the measurement target;
a region-of-interest setting unit configured to change a position of a region-of-interest in accordance with a movement of the image of the pattern of light in a capturing area captured by the image capturing unit, the region-of-interest being for acquiring information used to measure the measurement target, and being set to include the image of the pattern of light at least in part of the capturing area; and
a measurement unit configured to measure a shape of the measurement target based on a position of the image of the pattern of light in the region-of-interest, wherein
the region-of-interest setting unit changes the position of the region-of-interest based on at least one of a moving distance and a moving direction of the image of the pattern of light in the capturing area of the image capturing unit, the moving distance and the moving direction being with a relative movement of the projection unit and the measurement target performed by the movement unit.

28. A shape measuring device comprising:
a projection unit configured to project a pattern of light onto a measurement target;
an image capturing unit configured to capture a picture image of a measurement target onto which the pattern of light is projected by the projection unit;
a movement unit capable of moving a projected position of the pattern of light on the measurement target by relatively moving the projection unit and the measurement target;
a region-of-interest setting unit configured to change a position of a region-of-interest in accordance with a movement of the image of the pattern of light in a capturing area captured by the image capturing unit, the region-of-interest being for acquiring information used to measure the measurement target, and being set to include the image of the pattern of light at least in part of the capturing area; and
a measurement unit configured to measure a shape of the measurement target based on a position of the image of the pattern of light in the region-of-interest, wherein
the region-of-interest setting unit changes the position of the region-of-interest based on a distance between the image of the pattern of light and an edge of the region-of-interest.

29. The shape measuring device according to claim 28, wherein,
the region-of-interest setting unit determines whether to change the position of the region-of-interest based on the distance between the image of the pattern of light and an edge of the region-of-interest, and, in case where the distance is same as or less than a predetermined distance, changes the position of the region-of-interest to make the distance longer than the predetermined distance.

30. A structured object manufacturing system comprising:
a shaping device configured to shape a structured object based on designing information related to the shape of the structured object;
the shape measuring device according to claim 27 configured to measure the shape of the structured object shaped by the shaping device; and
a control device configured to compare the designing information and shape information indicating the shape of the structured object measured by the shape measuring device.

31. A non-transitory computer readable recording medium storing a shape measuring program that projects a pattern of light onto a measurement target, acquires picture image data by capturing a picture image of an image of the pattern of light projected onto the measurement target in a direction different from a projection direction of the pattern of light, and measures the shape of the measurement target based on the image of the pattern of light of the picture image data, the shape measuring program being configured to cause a computer to execute:

moving a projected position of the pattern of light relative to the measurement target;
changing a position of a region-of-interest in accordance with a movement of the image of the pattern of light in a capturing area which is captured, the region-of-interest being for acquiring information used to measure the measurement target, and being set to include the image of the pattern of light at least in part of the capturing area;
measuring a shape of the measurement target based on a position of the image of the pattern of light in the region-of the-interest; and
changing the position of the region-of-interest based on at least one of a moving distance and a moving direction of the image of the pattern of light in the capturing area, the moving distance and the moving direction being with a relative movement of the projection unit and the measurement target.

32. A non-transitory computer readable recording medium storing a shape measuring program that projects a pattern of light onto a measurement target, acquires picture image data by capturing a picture image of an image of the pattern of light projected onto the measurement target in a direction different from a projection direction of the pattern of light, and measures the shape of the measurement target based on the image of the pattern of light of the picture image data, the shape measuring program being configured to cause a computer to execute:

moving a projected position of the pattern of light relative to the measurement target;
changing a position of a region-of-interest in accordance with a movement of the image of the pattern of light in a capturing area which is captured, the region-of-interest being for acquiring information used to measure the measurement target, and being set to include the image of the pattern of light at least in part of the capturing area;
measuring a shape of the measurement target based on a position of the image of the pattern of light in the region-of the-interest; and
changing the position of the region-of-interest based on a distance between the image of the pattern of light and an edge of the region-of-interest.

* * * * *